US011628615B2

(12) United States Patent
Hou

(10) Patent No.: US 11,628,615 B2
(45) Date of Patent: Apr. 18, 2023

(54) PHOTOCURING-TYPE THREE-DIMENSIONAL PRINTING DEVICE CAPABLE OF AUTOMATIC CONTINUOUS PRINTING

(71) Applicant: Prismlab China Ltd., Shanghai (CN)

(72) Inventor: Feng Hou, Shanghai (CN)

(73) Assignee: PRISMLAB CHINA LTD., Shanghai (CN)

( * ) Notice: Subject to any disclaimer, the term of this patent is extended or adjusted under 35 U.S.C. 154(b) by 289 days.

(21) Appl. No.: 16/470,008

(22) PCT Filed: Feb. 14, 2018

(86) PCT No.: PCT/CN2018/076813
§ 371 (c)(1),
(2) Date: Jun. 14, 2019

(87) PCT Pub. No.: WO2018/108189
PCT Pub. Date: Jun. 21, 2018

(65) Prior Publication Data
US 2020/0086554 A1    Mar. 19, 2020

(30) Foreign Application Priority Data
Dec. 15, 2016 (CN) .......................... 201611162603.7

(51) Int. Cl.
*B29C 64/379* (2017.01)
*B29C 64/124* (2017.01)
(Continued)

(52) U.S. Cl.
CPC .......... *B29C 64/124* (2017.08); *B29C 64/321* (2017.08); *B29C 64/379* (2017.08);
(Continued)

(58) Field of Classification Search
CPC ..... B29C 64/241; B29C 64/245; B29C 64/40; B29C 64/214; B29C 64/209;
(Continued)

(56) References Cited

U.S. PATENT DOCUMENTS 5,248,456 A * 9/1993 Evans, Jr. .............. B33Y 40/20
118/712
5,474,719 A * 12/1995 Fan ........................ B33Y 10/00
427/512

(Continued)

FOREIGN PATENT DOCUMENTS

CN       203919727      11/2014
CN       104385591      3/2015
(Continued)

OTHER PUBLICATIONS

Patent Translate, "Description CN-206264354-U", Apr. 23, 2021, EPO and Google. (Year: 2021).*

(Continued)

*Primary Examiner* — Joseph S Del Sole
*Assistant Examiner* — Margaret B Hayes
(74) *Attorney, Agent, or Firm* — Kilpatrick Townsend & Stockton LLP

(57) ABSTRACT

Provided are a photocuring-type three-dimensional printing device capable of automatic continuous printing, and a system. A three-dimensional model is automatically composed, the composed three-dimensional model is automatically printed and pick-up collected, and a material tank can also be automatically replenished when replenishment is needed, thereby implementing automatic continuous printing without manual intervention.

20 Claims, 17 Drawing Sheets

(51) Int. Cl.
*B33Y 10/00* (2015.01)
*B33Y 30/00* (2015.01)
*B33Y 40/00* (2020.01)
*B33Y 50/02* (2015.01)
*B29C 64/321* (2017.01)
*B29C 64/393* (2017.01)

(52) U.S. Cl.
CPC ............ *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC ... B29C 64/129; B29C 64/321; B29C 64/393; B29C 64/10; B29C 64/106; B29C 64/124; B29C 64/20; B29C 64/227; B29C 64/25; B29C 64/264; B29C 64/30
See application file for complete search history.

(56) References Cited

U.S. PATENT DOCUMENTS

| | | | | |
|---|---|---|---|---|
| 9,381,701 | B1* | 7/2016 | Dufort | B33Y 50/02 |
| 2002/0090410 | A1* | 7/2002 | Tochimoto | B29C 64/321 |
| | | | | 425/215 |
| 2005/0275129 | A1* | 12/2005 | Sambu | B33Y 80/00 |
| | | | | 264/113 |
| 2007/0126157 | A1* | 6/2007 | Bredt | B33Y 10/00 |
| | | | | 425/375 |
| 2012/0267827 | A1* | 10/2012 | Kritchman | B29C 64/386 |
| | | | | 264/308 |
| 2014/0220168 | A1* | 8/2014 | Perez | B29C 37/0007 |
| | | | | 425/161 |
| 2015/0056321 | A1* | 2/2015 | Zhang | B29C 64/35 |
| | | | | 425/225 |
| 2015/0220748 | A1* | 8/2015 | Leach | G06F 21/608 |
| | | | | 726/26 |
| 2016/0089839 | A1* | 3/2016 | Huang | B33Y 40/00 |
| | | | | 425/147 |
| 2016/0137839 | A1* | 5/2016 | Rolland | C09D 175/04 |
| | | | | 522/81 |
| 2016/0159010 | A1* | 6/2016 | Perez | B29C 64/182 |
| | | | | 425/375 |
| 2016/0207258 | A1* | 7/2016 | Handa | B29C 64/182 |
| 2020/0238446 | A1* | 7/2020 | Worthing, Jr. | B23P 6/007 |
| 2021/0046704 | A1* | 2/2021 | Huttunen | B29C 64/393 |
| 2022/0111590 | A1* | 4/2022 | Sieradzki | B33Y 10/00 |
| 2022/0193778 | A1* | 6/2022 | Diosdado Borrego | B33Y 40/00 |

FOREIGN PATENT DOCUMENTS

| | | |
|---|---|---|
| CN | 104608387 | 5/2015 |
| CN | 205272607 | 6/2016 |
| CN | 106156406 | 11/2016 |
| CN | 206264354 | 6/2017 |
| WO | 2016181149 | 11/2016 |

OTHER PUBLICATIONS

Patent Translate, "Description CN206264354U", Aug. 4, 2021, EPO and Google. (Year: 2021).*
PCT/CN2018/076813, "International Search Report and Written Opinion", dated May 15, 2018, 17 pages.

* cited by examiner

PHOTOCURING-TYPE THREE-DIMENSIONAL PRINTING DEVICE CAPABLE OF AUTOMATIC CONTINUOUS PRINTING

CROSS-REFERENCES TO RELATED APPLICATIONS

The present application is a U.S. National Stage of International PCT/CN2018/076813, filed Feb. 14, 2018, which application claims priority to Chinese Patent Application No. 201611162603.7, filed Dec. 15, 2016, the entire contents of which are incorporated by reference in their entirety for all purposes.

TECHNICAL FIELD

The present invention mainly relates to the field of photocuring-type three-dimensional printing, and more particularly to a photocuring-type three-dimensional printing device capable of automatic continuous printing, a method and a system.

BACKGROUND ART

Three-dimensional printing technology is based on a computer three-dimensional design model to build up and bond special materials, such as metal powder, ceramic powder, plastic and cell tissue in a layer-wise manner by means of a laser beam, a hot-melt nozzle etc. via a software layered discretization and numerical control molding system so as to finally mold same by superimposition to manufacture a physical product. Rather than shaping and cutting raw materials for finally obtaining a product in the traditional manufacturing industry by means of machining, such as molding and turn milling, three-dimensional printing converts a three-dimensional physical object into several two-dimensional planes for production by processing and superimposing the materials layer by layer, thereby greatly reducing the complexity of manufacturing. This digital manufacturing mode can directly produce parts of any shape from computer graphic data without needing a complicated process, a bulky machine tool and massive labor, so that the production can be utilized by a broader range of producers.

At present, molding methods of three-dimensional printing technology are still evolving, and the materials used are also various. Among these molding methods, the photocuring method is relatively mature. The photocuring method uses the principle that a photosensitive resin is cured after being irradiated by an ultraviolet laser so as to mold the material in an additive way, and has the characteristics of a high molding precision, a good surface finish, a high material utilization, etc.

FIG. 1 is a basic structure of a photocuring-type three-dimensional printing device. Such a three-dimensional printing device 100 comprises a material tank 110 configured to accommodate a photosensitive resin, a lifting platform 120 configured to be connected to a molded workpiece, a coating blade 130 configured to spread the photosensitive resin, an image exposure system 140 configured to cure the photosensitive resin, and a control system 150 configured to control the operation of the lift table 120, the coating blade 130 and the image exposure system 140. The image exposure system 140 is located above the material tank 110, and can irradiate a light beam image to enable a layer of photosensitive resin at the liquid level of the material tank 110 to be cured. Each time after the image exposure system 140 irradiates the light beam image to cause the layer of the photosensitive resin to be cured, the lifting platform 120 will drive the layer of molded and cured photosensitive resin to move downward slightly, and enable the photosensitive resin to be uniformly spread on a top face of the cured workpiece via the coating blade 130 and to get ready for the next irradiation. The cycle repeats, and a three-dimensional workpiece, which is molded by layered superimposition, will be obtained.

In the existing, conventional three-dimensional printing technology, since both the size and shape of the three-dimensional model to be printed are irregular and cannot be automatically composed, one or more three-dimensional models that need to be printed are manually composed on a computer, and after the composition is completed, the model is sent as a whole to the three-dimensional printing device for printing. In other words, the existing three-dimensional printing device cannot realize automatic composition of multiple three-dimensional models, which is not a problem in the general three-dimensional printing device, because the size and the shape of the three-dimensional model that needs to be printed by the ordinary three-dimensional printing device are irregular, and the ordinary three-dimensional printing device usually takes a dozen or even dozens of hours to print an object, so that the number of times of composing required in one day is limited. However, in the high-speed three-dimensional printing device, when printing small items (for example, printing a dental model), printing can be completed in one hour, thereby requiring repeated manual composition, which is time consuming and laborious.

In the existing photocuring-type three-dimensional printing device, after the workpiece is printed, the workpiece is manually removed, and if necessary, the liquid photosensitive resin needs to be replenished (hereinafter referred to as liquid replenishment) before the next printing can be started, which is not a problem in the general three-dimensional printing device because the ordinary three-dimensional printing device usually takes a dozen or even tens of hours to print an object, so that the number of times of removal of the workpiece and liquid replenishment in one day is limited. However, in the high-speed three-dimensional printing device, when printing small items (for example, printing a dental model), printing can be completed in one hour, and the number of manual interventions for the removal of the workpiece and liquid replenishment is very frequent. These three-dimensional printing devices are not capable of continuous automatic printing and are less efficient.

In addition, the existing photocuring-type three-dimensional printing device rarely has the ability to automatically replenish liquid, because the photosensitive resin has a large viscosity, and the amount of replenished liquid required each time is usually small. If a high-viscosity liquid replenishment pump is used to extract the photosensitive resin for liquid replenishment, since the high-viscosity pump has a high price and a large volume, generally has a large flow rate, and cannot accurately control the amount of replenished liquid, the three-dimensional printing device adopting such a solution has high costs, a large volume and a poor liquid replenishment accuracy.

SUMMARY OF THE INVENTION

The technical problem to be solved by the present invention is to provide a three-dimensional printing device and a printing method, which can perform automatic continuous printing without manual intervention, and have a high printing efficiency.

In order to solve the above technical problem, an aspect of the present invention provides a photocuring-type three-dimensional printing device capable of automatic continuous printing, comprising an automatic composition system, an automatic printing and pick-up collecting apparatus, and an automatic liquid replenishment apparatus, wherein the automatic printing and pick-up collecting apparatus is provided with a material tank for accommodating a photosensitive resin and a lifting platform for being connected to a molded workpiece;

the automatic composition system is configured to receive and compose a plurality of three-dimensional models, and output the composed three-dimensional models;

the automatic printing and pick-up collecting apparatus is configured to receive and print the composed three-dimensional models, and remove the workpiece from the lifting platform and collect the workpiece after the printing is completed; and the automatic liquid replenishment apparatus is configured to determine whether liquid replenishment is required, and if so, the material tank is replenished with the photosensitive resin.

In an embodiment of the present invention, the automatic composition system composes the plurality of three-dimensional models according to a composition rule as follows:

the plurality of three-dimensional models are arranged in n rows in a direction parallel to the length of a coating blade configured to spread the photosensitive resin, and the heights of the plurality of three-dimensional models in the n rows satisfy the following relationship:

assuming that the i-th row is a row where the three-dimensional models having the highest height among the plurality of three-dimensional models are located, the minimum height of multiple three-dimensional models in the i-th row is greater than or equal to the highest height of multiple three-dimensional models in the i+1-th and i−1-th rows, the lowest height of the multiple three-dimensional models in the i+1-th row is greater than or equal to the highest height of multiple three-dimensional models in the i+2-th row, the lowest height of the multiple three-dimensional models in the i−1-th row is greater than or equal to the highest height of multiple three-dimensional models in the i−2-th row, and so on, where n is a natural number, and i=1, 2, . . . , n.

In an embodiment of the present invention, multiple three-dimensional models in at least one of the n rows are disposed in such a way that the heights thereof decrease in one direction.

In an embodiment of the present invention, multiple three-dimensional models in at least one of the n rows are disposed in such a way that the heights thereof decrease from the middle to two sides.

In an embodiment of the present invention, the automatic composition system comprises: an ordering module configured to arrange the plurality of three-dimensional models from the highest to the lowest in height; a dividing module configured to divide the arranged three-dimensional models into n rows according to a boundary condition; and an inter-row adjustment module configured to perform position adjustment on the plurality of three-dimensional models divided into the n rows in units of rows.

In an embodiment of the present invention, the automatic composition system comprises: an in-row adjustment module configured to perform in-row position adjustment on multiple three-dimensional models in at least one of the n rows.

In an embodiment of the present invention, the coating blade only scratches an area being printed.

In an embodiment of the present invention, the automatic composition system comprises: an ordering module configured to calculate dimensions of a bounding box for the plurality of three-dimensional models, and arrange the plurality of three-dimensional models in descending order according to the width of the bounding box;

a space allocation module configured to attempt to allocate a row or column space in the lifting platform according to the maximum width of the remaining three-dimensional models, and determine whether the space of the lifting platform is sufficient;

an arranging module configured to extract multiple three-dimensional models and arrange same into a row or column if the lifting platform has a sufficient space; and a row/column space compression module configured to reduce the spacing between rows or columns after the multiple three-dimensional models are arranged into a row or column.

In an embodiment of the present invention, the automatic composition system further comprises a model entirety centering module configured to centrally dispose the entirety of the models with respect to the space of the lifting platform when the lifting platform does not have a sufficient space.

In an embodiment of the present invention, the automatic printing and pick-up collecting apparatus is further provided with a jacking apparatus provided below the lifting platform, a collecting blade provided above the lifting platform, and a storage apparatus;

a plurality of through holes are distributed in the lifting platform;

the jacking apparatus has a plurality of ejector rods corresponding to the plurality of through holes, and is configured to jack up the workpiece molded on the lifting platform to separate the workpiece from the lifting platform;

the collecting blade is configured to scrape the workpiece, which is separated from the lifting platform, away from the lifting platform; and the storage apparatus is configured to accommodate the collected workpiece.

In an embodiment of the present invention, the jacking apparatus is further provided with a vibration apparatus; and the vibration apparatus vibrates the plurality of ejector rods in the process of jacking the workpiece up by the plurality of ejector rods.

In an embodiment of the present invention, the lifting platform is provided with a lifting apparatus and a platform, the platform is detachably connected to the lifting apparatus, and the workpiece is molded on the platform; and the automatic printing and pick-up collecting apparatus is further provided with an automatic replacement apparatus configured to remove the platform having the workpiece from the lifting apparatus and provide a new platform on the lifting apparatus.

In an embodiment of the present invention, the automatic liquid replenishment apparatus is provided with a liquid replenishment case and an electric valve;

the liquid replenishment case is provided above the material tank and configured to accommodate the photosensitive resin;

the electric valve is connected to a bottom face and/or the bottom of a side face of the liquid replenishment case; and when the material tank needs to be replenished, the electric valve is opened, so that the photosensitive resin in the liquid replenishment case flows into the material tank under the action of gravity.

In an embodiment of the present invention, the automatic liquid replenishment apparatus is provided with a sealed liquid replenishment case and a gas pumping apparatus;

the liquid replenishment case is configured to accommodate the photosensitive resin;

the gas pumping apparatus is configured to inject a gas into the liquid replenishment case; and when the material tank needs to be replenished, the gas pumping apparatus injects the gas into the liquid replenishment case, such that the photosensitive resin in the liquid replenishment case flows into the material tank under the action of gas pressure.

In an embodiment of the present invention, the automatic liquid replenishment apparatus is further provided with a liquid level detection apparatus configured to detect the liquid level of the photosensitive resin in the material tank.

A further aspect of the present invention is to provide a photocuring-type three-dimensional printing system capable of automatic continuous printing, comprising a host computer and a plurality of photocuring-type three-dimensional printing devices as described above, wherein the host computer queries the states of the plurality of photocuring-type three-dimensional printing devices when receiving a print job, and if there is an idle photocuring-type three-dimensional printing device, the host computer sends the three-dimensional model of the current job to the one or more photocuring-type three-dimensional printing devices in an idle state for printing; and after receiving the three-dimensional model, the photocuring-type three-dimensional printing device automatically composes, automatically prints, and pick-up collects the three-dimensional model, and liquid replenishment is automatically carried out when needed.

In an embodiment of the present invention, the system further comprises a server; and the server is configured to receive and process a print job from a remote user, and send the print job from the remote user to the host computer when the host computer is connected to the server via a network to obtain the print job.

A still further aspect of the present invention is to provide an automatic continuous printing method, implemented by a photocuring-type three-dimensional printing device provided with a material tank configured to accommodate a photosensitive resin and a lifting platform configured to be connected to a molded workpiece, wherein the method comprises the following steps:

S11: receiving and composing a plurality of three-dimensional models;

S12: printing the composed three-dimensional models;

S13: removing the workpiece from the lifting platform after the printing is completed;

S14: determining whether liquid replenishment is required, if yes, proceeding to step S15, and if no, proceeding to step S16;

S15: replenishing the material tank with the photosensitive resin, and proceeding to step S16 after the liquid replenishment is completed; and S16: determining whether a next round of printing is required, if yes, returning to step S11, and if no, ending the printing.

A yet further aspect of the present invention is to provide an automatic continuous printing method, implemented by a photocuring-type three-dimensional printing device provided with a material tank configured to accommodate a photosensitive resin and a lifting platform configured to be connected to a molded workpiece, wherein the method comprises the following steps:

S21: receiving and composing a plurality of three-dimensional models;

S22: printing the composed three-dimensional models;

S23: removing the workpiece from the lifting platform after the printing is completed;

S24: determining whether a next round of printing is required, if yes, proceeding to step S25, and if no, ending the printing;

S25: determining whether liquid replenishment is required, if yes, proceeding to step S26, and if no, returning to step S21; and S26: replenishing the material tank with the photosensitive resin, and returning to step S21 after the liquid replenishment is completed.

In an embodiment of the present invention, the composing of the plurality of three-dimensional models is performed according to a composition rule as follows:

the plurality of three-dimensional models are arranged in n rows in a direction parallel to the length of a coating blade configured to spread the photosensitive resin, and the heights of the plurality of three-dimensional models in the n rows satisfy the following relationship:

assuming that the i-th row is a row where the three-dimensional models having the highest height among the plurality of three-dimensional models are located, the minimum height of multiple three-dimensional models in the i-th row is greater than or equal to the highest height of multiple three-dimensional models in the i+1-th and i−1-th rows, the lowest height of the multiple three-dimensional models in the i+1-th row is greater than or equal to the highest height of multiple three-dimensional models in the i+2-th row, the lowest height of the multiple three-dimensional models in the i−1-th row is greater than or equal to the highest height of multiple three-dimensional models in the i−2-th row, and so on, where i=1, 2, . . . , n.

In an embodiment of the present invention, multiple three-dimensional models in at least one of the n rows are disposed in such a way that the heights thereof decrease in one direction.

In an embodiment of the present invention, multiple three-dimensional models in at least one of the n rows are disposed in such a way that the heights thereof decrease from the middle to two sides.

In an embodiment of the present invention, the step of composing the plurality of three-dimensional models comprises:

S1a: arranging the plurality of three-dimensional models from the highest to the lowest in height;

S1b: dividing the arranged three-dimensional models into n rows according to a boundary condition; and S1c: performing position adjustment on the plurality of three-dimensional models divided into the n rows in units of rows.

In an embodiment of the present invention, the method further comprises the following step after step S1b, before step S1c or after step S1c: S1d: performing in-row position adjustment on multiple three-dimensional models in at least one of the n rows.

In an embodiment of the present invention, the coating blade only scratches an area being printed.

In an embodiment of the present invention, the composing of the plurality of three-dimensional models comprises the following steps:

S1a': calculating dimensions of a bounding box for the plurality of three-dimensional models, and arranging the plurality of three-dimensional models in descending order according to the width of the bounding box;

S1b': attempting to allocate a row or column space in the lifting platform according to the maximum width of the remaining three-dimensional models;

S1c': determining whether the space of the lifting platform is sufficient, if yes, proceeding to step S1d', and if no, ending;

S1d': extracting multiple three-dimensional models and arranging same into a row or column; and S1e': compressing the space between rows or columns, and returning to step S1b'.

In an embodiment of the present invention, when the determination in step S1c' is no, before ending, step S1f' can be further comprised: centrally disposing the entirety of the models with respect to the space of the lifting platform.

In an embodiment of the present invention, a plurality of through holes are distributed in the lifting platform; a jacking apparatus is provided below the lifting platform, and the jacking apparatus has a plurality of ejector rods corresponding to the plurality of through holes; and the step of removing the workpiece from the lifting platform comprises:

S3a: the plurality of ejector rods passing through the plurality of through holes to jack up the workpiece to separate the workpiece from the lifting platform; and S3b: scraping the workpiece, which is separated from the lifting platform, away from the lifting platform, and the workpiece entering a storage apparatus.

In an embodiment of the present invention, the plurality of ejector rods are vibrated in the process of jacking the workpiece up by the plurality of ejector rods in step S3a.

In an embodiment of the present invention, the lifting platform is provided with a lifting apparatus and a platform, the platform is detachably connected to the lifting apparatus, and the workpiece is molded on the platform; and the step of removing the workpiece from the lifting platform comprises:

S3a': removing the platform having the workpiece from the lifting apparatus; and S3b': providing a new platform on the lifting apparatus.

In an embodiment of the present invention, the step of replenishing the material tank with the photosensitive resin is performed by providing a liquid replenishment case above the material tank and making the photosensitive resin in the liquid replenishment case flow into the material tank under the action of gravity during liquid replenishment.

In an embodiment of the present invention, the step of replenishing the material tank with the photosensitive resin is performed by providing a sealed liquid replenishment case, and injecting a gas into the liquid replenishment case such that the photosensitive resin in the liquid replenishment case flows into the material tank under the action of gas pressure.

The present invention has the advantages as follows with respect to the prior art:

the photocuring-type three-dimensional printing device of the present invention can automatically compose the three-dimensional models, automatically print the composed three-dimensional models, automatically remove and collect the printed workpiece from the lifting platform, and automatically replenish the material tank according to requirements, so that the entire printing process is automated, and the automatic continuous printing can be implemented without manual intervention.

The automatic composition method of the present invention can concentrate the higher three-dimensional models in one area, the area that needs to be printed gradually decreases as the printing progresses, and at this time, the scratching range of the coating blade can be reduced, and the printing efficiency can be improved.

Another automatic composition method of the present invention minimizes the spacing between three-dimensional models when arranging a plurality of three-dimensional models into rows or columns, and adjusts and also minimizes the spacing between rows or columns after arranging them into rows or columns, so that as many three-dimensional models as possible can be printed each time, thereby improving the printing efficiency.

The automatic printing and pick-up collecting apparatus of the present invention uses the ejector rods to jack up the workpiece from the lifting platform, separate the workpiece from the lifting platform, and scrape the workpiece from the lifting platform, or replaces the platform having the workpiece with a new platform to automatically remove the workpiece from the lifting platform.

For the automatic liquid replenishment apparatus of the present invention, an upper liquid replenishment case is used, the photosensitive resin flows into the material tank by its own gravity, and the replenishment timing and the amount of replenished liquid are controlled by the electric valve; or a sealed liquid replenishment case is used, and the gas is injected such that the photosensitive resin in the liquid replenishment case flows into the material tank to replenish the material tank. With these methods, the automatic liquid replenishment apparatus has the ability to transfer high-viscosity liquid materials, and has the advantages of low costs, small volume, and high liquid replenishment precision.

DETAILED DESCRIPTION OF EMBODIMENTS

To make the above objects, features and advantages of the present invention more apparent and easier to understand, particular embodiments of the present invention are described in detail below with reference to the accompanying drawings.

In the following description, numerous specific details are set forth in order to fully understand the present invention, but the present invention can also be implemented in other ways different from those described herein; therefore, the present invention is not limited to the particular embodiments disclosed hereinafter.

Embodiments of the present invention provide a photocuring-type three-dimensional printing device capable of automatic continuous printing and an automatic printing method, which can perform automatic composition, automatic printing and pick-up collecting, and automatic liquid replenishment, so that the entire printing process is automated, and the automatic continuous printing can be implemented without manual intervention. The photocuring-type three-dimensional printing device and the automatic printing method are especially suitable for printing small items, especially for printing dental models.

Figure 1:
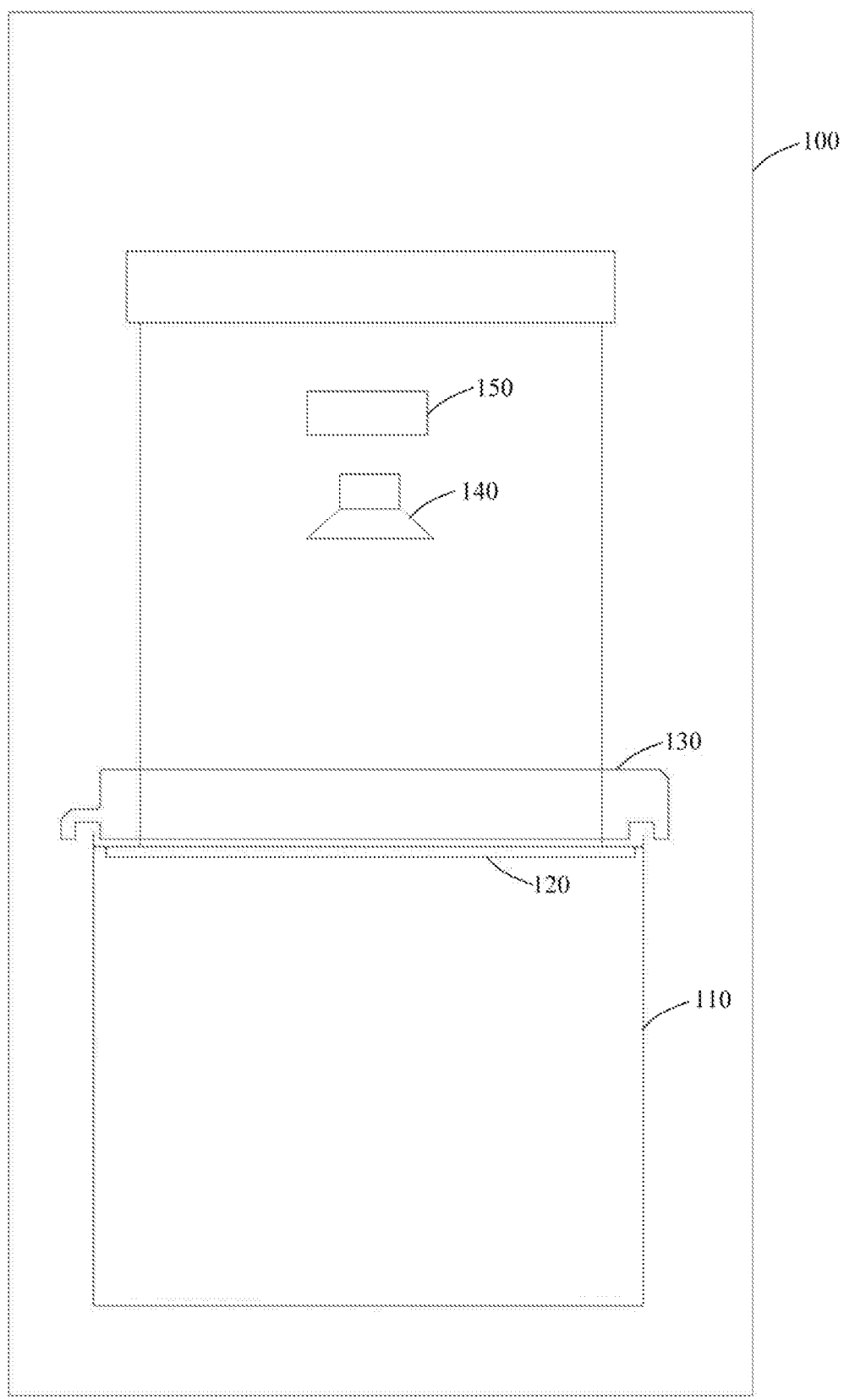
FIG. 1 is a basic structure of a photocuring-type three-dimensional printing device.
Figure 2:
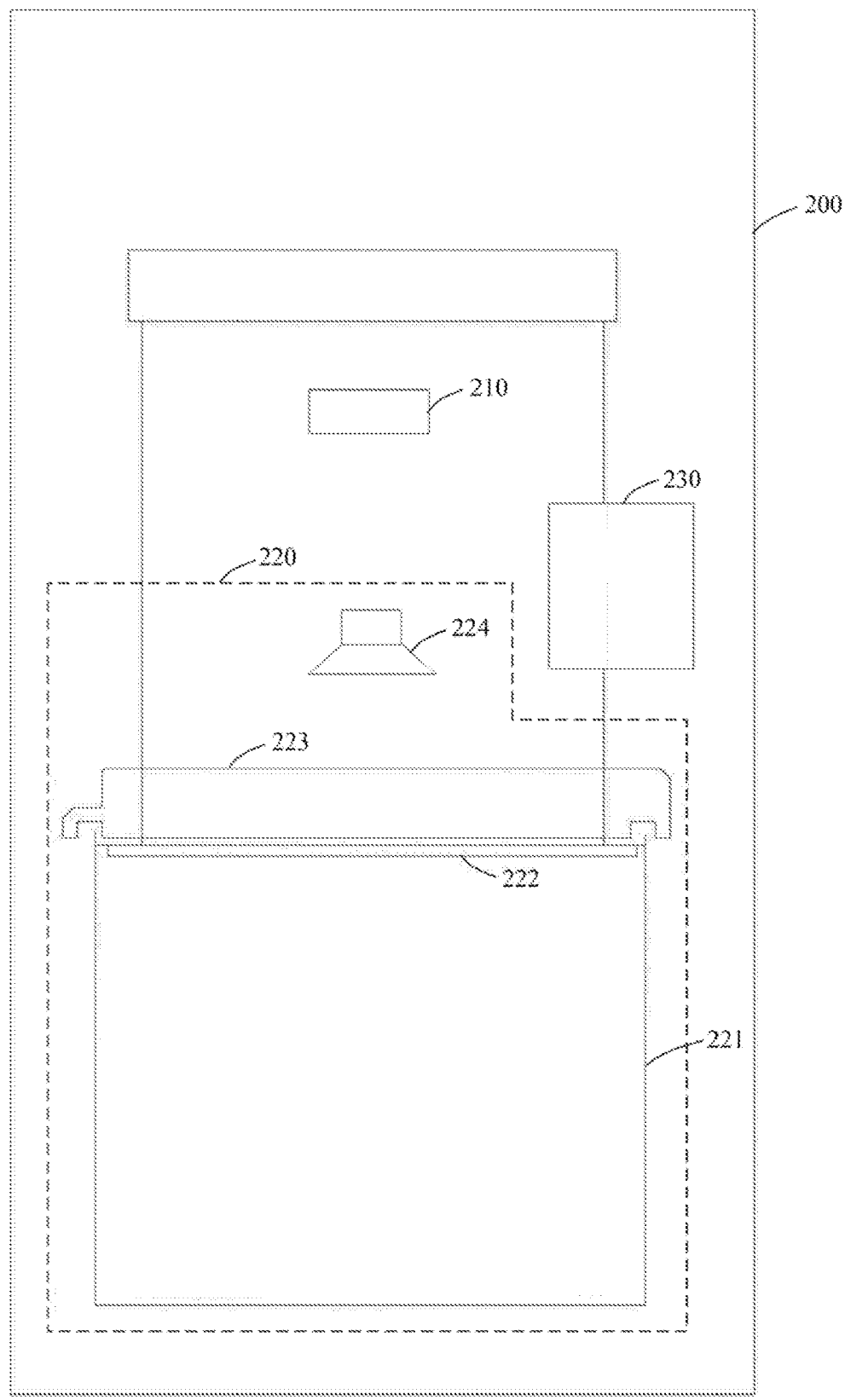
FIG. 2 is a schematic structural diagram of a photocuring-type three-dimensional printing device capable of automatic continuous printing according to an embodiment of the present invention.

FIG. 2 is a schematic structural diagram of a photocuring-type three-dimensional printing device capable of automatic continuous printing according to an embodiment of the present invention. Referring to FIG. 2, the photocuring-type three-dimensional printing device 200 may comprise an automatic composition system 210, an automatic printing and pick-up collecting apparatus 220, and an automatic liquid replenishment apparatus 230.

The automatic composition system 210 is configured to receive and compose a plurality of three-dimensional models, and output the composed three-dimensional models. In an embodiment, the automatic composition system 210 may receive the plurality of three-dimensional models from a host computer, or a mobile storage apparatus.

In an embodiment, the automatic composition system 210 may compose the plurality of three-dimensional models according to the following composition rule: the plurality of three-dimensional models are arranged in n rows in a direction parallel to the length of a coating blade 223 configured to spread the photosensitive resin, and the heights of the plurality of three-dimensional models in the n rows satisfy the following relationship: assuming that the i-th row is a row where the three-dimensional models having the highest height among the plurality of three-dimensional models are located, the minimum height of multiple three-dimensional models in the i-th row is greater than or equal to the highest height of multiple three-dimensional models in the i+1-th and i−1-th rows, the lowest height of the multiple three-dimensional models in the i+1-th row is greater than or equal to the highest height of multiple three-dimensional models in the i+2-th row, the lowest height of the multiple three-dimensional models in the i−1-th row is greater than or equal to the highest height of multiple three-dimensional models in the i−2-th row, and so on, where n is a natural number, and i=1, 2, . . . , n. This composition rule has two special cases, that is, when i=1 and i=n, the heights of the plurality of three-dimensional models at this time gradually decrease from the 1st row to the n-th row, or from the n-th row to the 1st row in a single direction.

Figure 3:
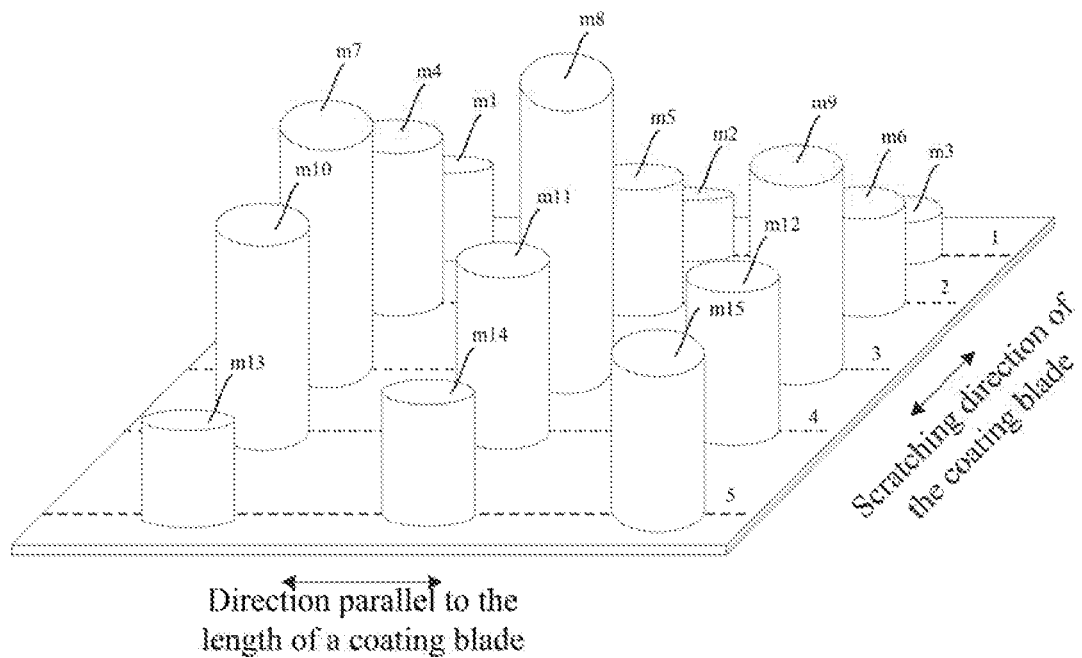
FIG. 3 is a schematic diagram of three-dimensional models after being composed according to an embodiment of the present invention.

In an embodiment, the three-dimensional models composed by the above-described composition rule are as shown in FIG. 3. In this embodiment, there are 15 three-dimensional models m1 to m15 arranged into 5 rows in a direction parallel to the length of the coating blade 223, each row having 3 three-dimensional models. The 3rd row has a three-dimensional model m8 with the highest height among the 15 three-dimensional models, and the height of the three-dimensional model m9 having the lowest height in the 3rd row is greater than the height of the three-dimensional model m4 having the highest height in the 2nd row, and the height of the three-dimensional model m9 having the lowest height in the 3rd row is greater than the height of the three-dimensional model m10 having the highest height in the 4th row. The height of the three-dimensional model m6 having the lowest height in the 2nd row is greater than the height of the three-dimensional model m1 having the highest height in the 1st row. The height of the three-dimensional model m12 having the lowest height in the 4th row is greater than the height of the three-dimensional model m15 having the highest height in the 5th row.

It can be seen from the principle of photocuring-type three-dimensional printing technology, the three-dimensional model having a lower height is always printed first, and the three-dimensional model having a higher height is printed later. The above-mentioned composition rule concentrates the three-dimensional models having higher heights in one area, and the three-dimensional models having lower heights are gradually printed as the printing progresses. The area to be printed is gradually reduced as the printing progresses. In this way, the area where the photosensitive resin needs to be spread by the coating blade 223 is gradually reduced as the printing progresses. Taking the embodiment shown in FIG. 3 as an example, after printing for a period of time, the three-dimensional models of the 1st row are printed first because of having the lower heights, and thereafter, the photocuring-type three-dimensional printing device 200 only needs to print the areas of the 2nd-5th rows, and the coating blade 223 may only scratch the areas of the 2nd-5th rows. As the printing progresses, the area where the coating blade 223 needs to be scratched is getting smaller and smaller, which reduces the time required for the scratching of the coating blade 223 and improves the printing efficiency.

In an embodiment, the three-dimensional models in at least one of the n rows of the composed three-dimensional models are disposed in such a way that the heights thereof decrease in one direction, as shown by the 4th or 5th row in FIG. 3.

In another embodiment, the three-dimensional models in at least one of the n rows of the composed three-dimensional models are disposed in such a way that the heights thereof decrease from the middle to two sides, as shown by the 3rd row in FIG. 3. Since the photocuring-type three-dimensional printing device 200 has a higher printing quality at the middle position of the lifting platform 222, the arrangement of this embodiment can make maximum use of the area with the higher printing quality.

Figure 4:
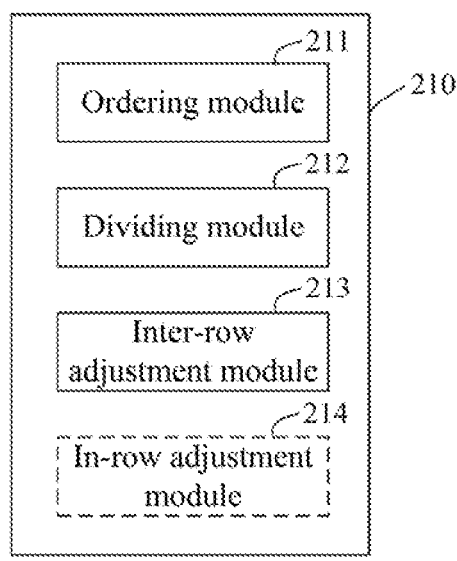
FIG. 4 is a schematic diagram of modules of an automatic composition system according to an embodiment of the present invention.

FIG. 4 is a schematic diagram of modules of an automatic composition system according to an embodiment of the present invention. Referring to FIG. 4, the automatic composition system 210 may have an ordering module 211, a dividing module 212, and an inter-row adjustment module 213. The ordering module 211 is configured to arrange the received plurality of three-dimensional models from the highest to the lowest in height. The dividing module 212 is configured to divide the arranged three-dimensional models into n rows according to a boundary condition. The inter-row adjustment module 213 is configured to perform position adjustment on the plurality of three-dimensional models divided into the n rows in units of rows.

In an embodiment, the automatic composition system 210 may also have an in-row adjustment module 214 configured to perform in-row position adjustment on multiple three-dimensional models in at least one of the n rows.

In an embodiment, the boundary condition for dividing the arranged plurality of three-dimensional models into n rows by the dividing module 212 may be that the sum of the maximum widths of the multiple three-dimensional models grouped into one row in the length direction of the coating blade 223 is less than or equal to the minimum of the width of the lifting platform 222 in the length direction of the coating blade 223 and the effective length of the coating blade 223, and the sum of the maximum widths of the plurality of three-dimensional models in the n rows in the scratching direction of the coating blade 223 is less than or equal to the width of the lifting platform 222 in the scratching direction of the coating blade 223. In this way, the areas obtained by the composed plurality of three-dimensional models projected onto the lifting platform 222 in a direction perpendicular to the lifting platform 222 are all within the range of the lifting platform 222, so as to avoid the incomplete printing of the three-dimensional models.

Figure 5:
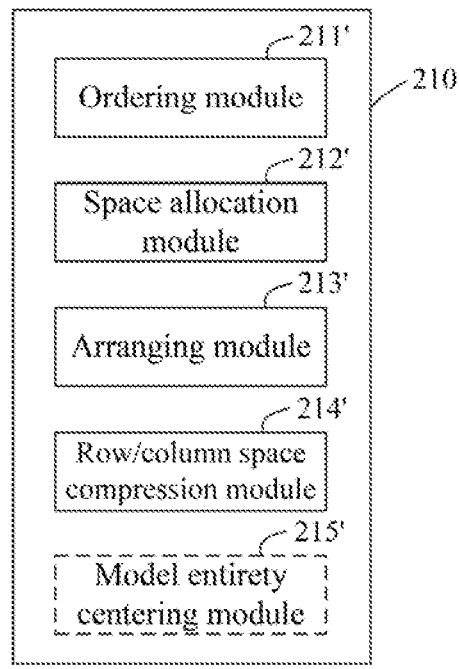
FIG. 5 is a schematic diagram of modules of an automatic composition system according to another embodiment of the present invention.

FIG. 5 is a schematic diagram of modules of an automatic composition system according to another embodiment of the present invention. Referring to FIG. 5, the automatic composition system 210 may comprises: an ordering module 211' configured to calculate dimensions of a bounding box for the plurality of three-dimensional models, and arrange the plurality of three-dimensional models in descending order according to the width of the bounding box; a space allocation module 212' configured to attempt to allocate a row or column space in the lifting platform 222 according to the maximum width of the remaining three-dimensional models, and determine whether the space of the lifting platform 222 is sufficient; an arranging module 213' configured to extract multiple three-dimensional models and arrange same into a row or column when the lifting platform 222 has a sufficient space; and a row/column space compression module 214' configured to reduce the spacing between rows or columns after the multiple three-dimensional models are arranged into a row or column. Optionally, the automatic composition system 210 may further comprise a model entirety centering module 215' configured to centrally dispose the entirety of the models with respect to the space of the lifting platform 222 when the lifting platform 222 does not have a sufficient space.

The arranging module 213' may arrange the extracted multiple three-dimensional models into one row or column in a manner as follows: extracting a three-dimensional model and calculating its contour projected in a direction perpendicular to the plane of the lifting platform 222; according to the bounding box of the current three-dimensional model, placing same in the row or column space in a centrally aligned manner next to the existing three-dimensional model; making the current three-dimensional model move close to the existing three-dimensional model in the row or column by a small fixed distance multiple time, until the contour of the current three-dimensional model intersects the contour of the existing three-dimensional model in the row or column, and at this time, the last movement of the current three-dimensional model is canceled; and determining whether the model exceeds the range of the lifting platform 222, if no, extracting a next three-dimensional model, and repeating the above operations, and if so, canceling the placement of the current model.

The row/column space compression module 214' may reduce the spacing between rows or columns in a manner as follows: making the current row or column move close to the previous row or column by a small fixed distance multiple time, until the contours of the three-dimensional models in the two rows or columns intersect, and at this time, the last movement of the current row or column is canceled.

Figure 6:
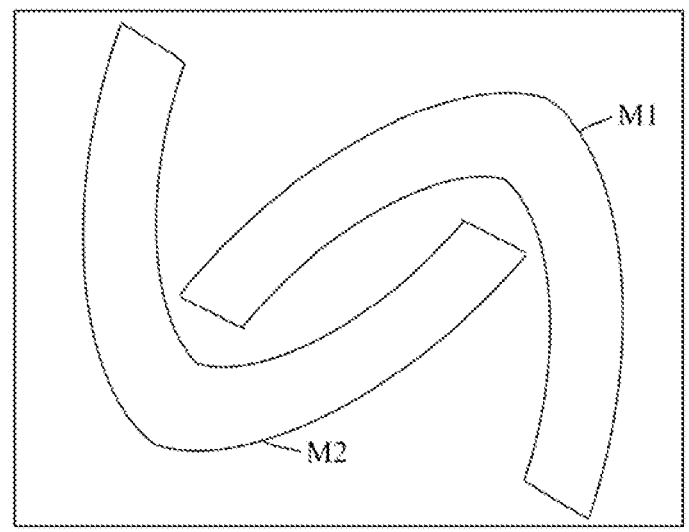
FIG. 6 is a schematic diagram of a dental model assembly unit according to an embodiment of the present invention.

In an embodiment of printing dental models, the automatic composition system 210 may first dispose a part of either of the two dental models into a recess of the other of the two dental models, assemble them into one unit, and then use the assembled unit as a composed unit for subsequent composition. As shown in FIG. 6, a part of the dental model M1 is disposed in the recess of the dental model M2, a part of the dental model M2 is disposed in the recess of the dental model M1, and the dental model M1 and the dental model M2 are assembled into one unit.

The automatic composition system 210 may be a module in the control system of the photocuring-type three-dimensional printing device, or may be a unit that is separately provided, and the invention is not limited thereto. The automatic composition system 210 may be implemented by, for example, computer software, hardware, or a combination of computer software and hardware. For hardware implementations, the automatic composition system 210 may be implemented by one or more application specific integrated circuits (ASICs), digital signal processors (DSPs), digital signal processing devices (DAPDs), programmable logic devices (PLDs), field programmable gate arrays (FPGAs), processors, controllers, micro-controllers, micro-processors, other electronic apparatuses for implementing the functions of the automatic composition system 210, or a selective combination of the above-described apparatuses. For software implementations, the automatic composition system 210 may be implemented by separate software modules, such as procedures and functions, each of which performs one or more functions and operations of the automatic composition system 210. Software codes may be implemented by application software written in a suitable programming language, and may be stored in a memory, and executed by a controller or processor.

FIG. *7a*-*7d* are schematic diagrams showing staged structures of an automatic printing and pick-up collecting apparatus according to an embodiment of the present invention. Referring to FIGS. 2 and *7a*-*7d*, the automatic printing and pick-up collecting apparatus 220 may comprise a material tank 221 configured to accommodate a photosensitive resin, a lifting platform 222 configured to be connected to a molded workpiece 300, and a coating blade 223 configured to spread the photosensitive resin, an image exposure system 224 configured to cure the photosensitive resin, a jacking apparatus 225 configured to separate the workpiece 300 from the lifting platform 222, and a collecting blade 226 configured to scrape the workpiece 300, which is separated from the lifting platform 222, away from the lifting platform 222. In this embodiment, the coating blade 223 and the collecting blade 226 are composed of the same apparatus, that is, the apparatus is used to spread the photosensitive resin, and is also used to scrape the workpiece 300, which is separated from the lifting platform 222, away from the lifting platform 222. In this way, the structure of the three-dimensional printing device can be simplified and the cost of the three-dimensional printing device can be reduced. It will be understood that two apparatuses may be provided to implement the functions of the coating blade 223 and the collecting blade 226 respectively, that is, an apparatus is provided for spreading the photosensitive resin, and the other apparatus is provided for scraping the workpiece 300, which is separated from the lifting platform 222, away from the lifting platform 222. In this way, although the structure of the three-dimensional printing device is complicated and costly, the workpiece 300 can be collected at any height.

The lifting platform 222 may be connected to a frame of the photocuring-type three-dimensional printing device 200 via a lead screw, and the lifting platform 222 can be moved up and down relative to the material tank 221. At the beginning of printing, the lifting platform 222 is immersed in the liquid photosensitive resin in the material tank 221, and forms a uniform liquid resin film with the liquid surface of the liquid photosensitive resin, the liquid resin film is irradiated with ultraviolet (UV) light emitted by the image exposure system 224 to cure same, the lifting platform 222 is then lowered by a certain distance, the cured layer is uniformly coated with a layer of liquid resin by the coating blade 223, the next layer is irradiated with the ultraviolet light to cure same, and the cycle is continued until the printing of the workpiece 300 is completed. It can be seen therefrom that the workpiece 300 is directly cured on the lifting platform 222, and the photosensitive resin generally has a very good viscosity, which allows the printed workpiece 300 to be securely connected to the lifting platform 222. In order to remove the printed workpiece 300 from the lifting platform 222, the prior art typically shovels it down by a worker using a tool such as a shovel blade. In order to enable automatic removal of the printed workpiece 300, the lifting platform 222 of the present embodiment is distributed with a plurality of through holes, which cooperate with ejector rods of the jacking apparatus 225, so that the printed workpiece 300 can be separated from the lifting platform 222, even if the printed workpiece 300 is in a non-secure connection with the lifting platform 222. Since the photocuring-type three-dimensional printing technology can print one or more workpieces at one time, although in the embodiment shown in FIG. *7a*-*7d*, there is only one workpiece 300, it will be understood that multiple workpieces can be molded on the lifting platform 222, and the jacking apparatus 225 can be used to separate the multiple workpieces from the lifting platform 222 at one time.

The jacking apparatus 225 is disposed below the lifting platform 222 and has a plurality of ejector rods corresponding to the plurality of through holes in the lifting platform 222. In this embodiment, the jacking apparatus 225 is provided at the bottom of the material tank 221. After the printing of the workpiece 300 is completed, the lifting platform 222 is lowered to the bottom of the material tank 221, the ejector rods pass through the corresponding through holes in the lifting platform 222, and the printed workpiece 300 is jacked up, so that the printed workpiece 300 is separated from the lifting platform 222. It will be understood that the jacking apparatus 225 can be placed anywhere in the material tank 221 as long as the highest ejector rod does not pass through the corresponding through hole in the lifting platform 222 when the printing of the workpiece 300 is completed. In an embodiment, the jacking apparatus 225 can move up and down inside the material tank 221. After the printing of the workpiece 300 is completed, the jacking apparatus 225 can be moved upwardly, the ejector rods pass through the corresponding through holes in the lifting platform 222, and the printed workpiece 300 is jacked up, so that the printed workpiece 300 is separated from the lifting platform 222. It will be understood that the lifting platform 222 can be moved downwardly while the jacking apparatus 225 is moved upwardly, to shorten the time required for one of the lifting platform 222 and the jacking apparatus 225 to move to the other.

In this embodiment, each ejector rod has a different height. For example, the top ends of the plurality of ejector rods form a slope as shown in FIG. *7a* or FIG. *7c*, so that the plurality of ejector rods from the highest to the lowest can successively come into contact with the workpiece 300, and the workpiece 300 is gradually separated from the lifting platform 222 from side to side. The force required for this gradual separation is relatively small relative to the way in which the entire workpiece 300 is jacked up at the same time to separate the workpiece 300 from the lifting platform 222. Preferably, the inclined angle of the slope is 5-15 degrees. In the embodiment not illustrated, the top ends of the plurality of ejector rods may also form a step, that is, the change in height is not as smooth as in FIG. *7a* or FIG. *7c*, but jumps. The top ends of the plurality of ejector rods may also be stepped with a slope, that is, the top ends of the plurality of ejector rods forming a step form a slope. In addition, the top ends of the plurality of ejector rods may also have a shape similar to one of a triangular wave, a sawtooth wave, a sine wave, etc., or any combination thereof. It will be understood that the plurality of ejector rods may also have the same height, and the top ends thereof form a plane. In this way, the entire workpiece 300 is jacked up at the same time, such that the workpiece 300 is separated from the lifting platform 222. It should be noted that the photocuring-type three-dimensional printing device 200 can simultaneously print multiple workpieces 300, so that the lifting platform 222 can have multiple workpieces 300 at the same time. The jacking apparatus 225 can jack all the workpieces up to separate them from the lifting platform 222.

In an embodiment, the jacking apparatus 225 may be further provided with a vibration apparatus (not shown) configured to vibrate the plurality of ejector rods when the plurality of ejector rods jack up the workpiece 300, to facilitate the separation of the workpiece 300 from the lifting platform 222. It will be understood that the vibration of the plurality of ejector rods may be a vertical vibration in an axial direction of the ejector rod, or may be a horizontal vibration in a radial direction of the ejector rod.

The collecting blade 226 is provided above the lifting platform 222, which can be moved from one end to the other above the lifting platform 222, for example, from the rear to the front, or from the left to the right of the photocuring-type three-dimensional printing device 200. After the printing is completed, the jacking apparatus 225 separates the workpiece 300 from the lifting platform 222, the lifting platform 222 moves upwardly to the position where the collecting blade 226 can scrape the workpiece 300, and the collecting blade 226 moves from one end to the other above the lifting platform 222, to scrape the workpiece 300 away from the lifting platform 222.

Optionally, the automatic printing and pick-up collecting apparatus 220 may further comprise a storage apparatus (not shown) configured to accommodate the collecting blade 226 for scraping the workpiece 300 away from the lifting platform 222. The storage apparatus can be provided on one side of the material tank 221, and when the collecting blade 226 is moved from one end to the other to scrape the work 300 away from the lifting platform 222, the workpiece 300 is directly dropped into the storage apparatus. In addition, the storage apparatus may be of a multi-layered structure, and the layers can be moved up and down, and each layer can collect one or more workpieces 300 scraped away from the lifting platform 222 by the collecting blade 226 at one or more times. Preferably, each layer of the storage apparatus collects one or more workpieces 300 scraped away from the lifting platform 222 by the collecting blade 226 at one time, which facilitates continuous automated post-processing.

Figure 7A:
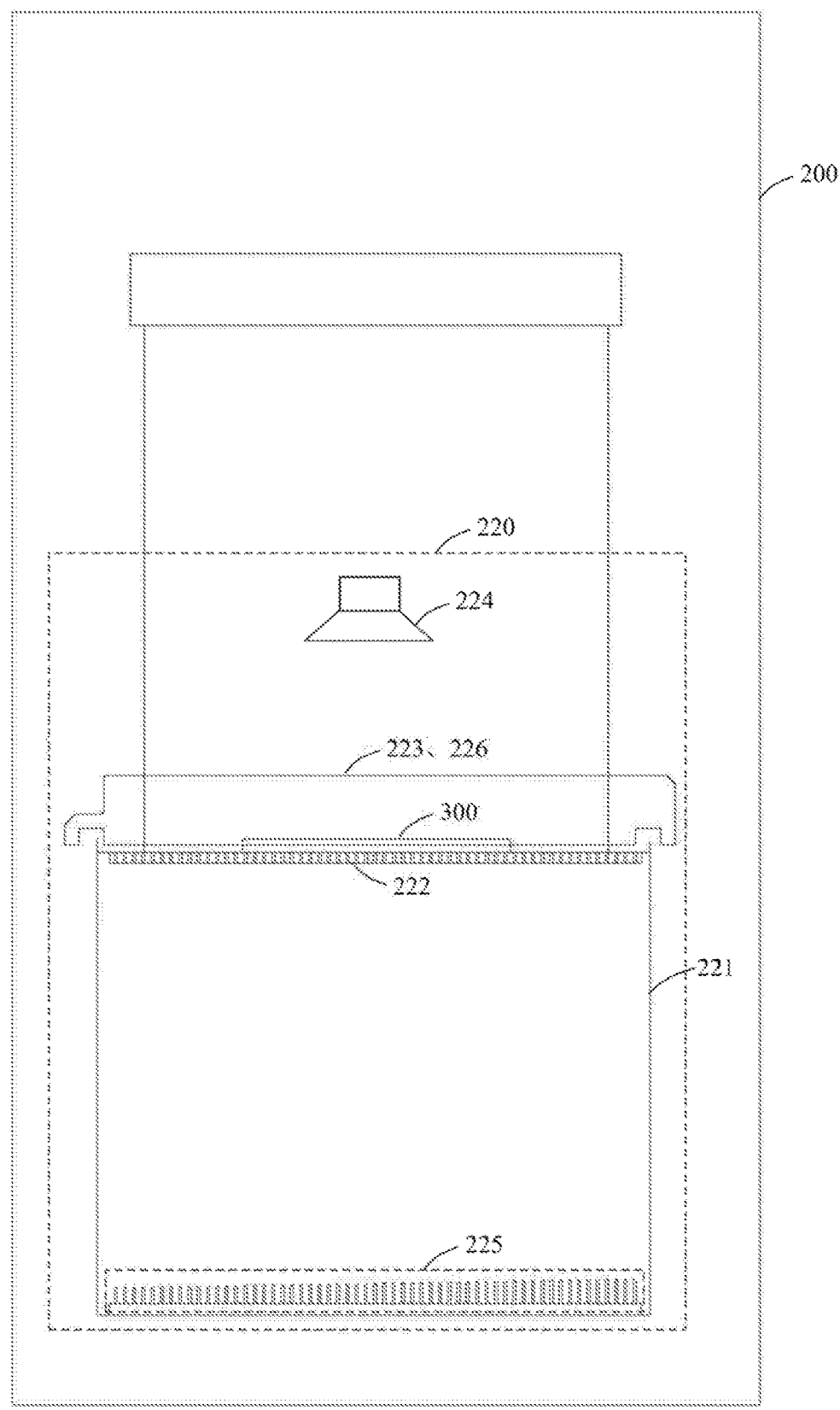
FIG. 7a-7d are schematic diagrams showing staged structures of an automatic printing and pick-up collecting apparatus according to an embodiment of the present invention.

FIG. 7*a* is schematic structural diagram of an automatic printing and pick-up collecting apparatus before the workpiece is jacked up according to an embodiment of the present invention. Referring to FIG. 7*a*, when the printing of the workpiece 300 is completed, the workpiece 300 is securely connected to the lifting platform 222. The lifting platform 222 is located inside the material tank 221. In this embodiment, the jacking apparatus 225 is provided at the bottom of the material tank 221. At the beginning of the automatic pick-up, the lifting platform 222 carrying the workpiece 300 moves downwardly up to the bottom of the material tank 221.

Figure 7B:
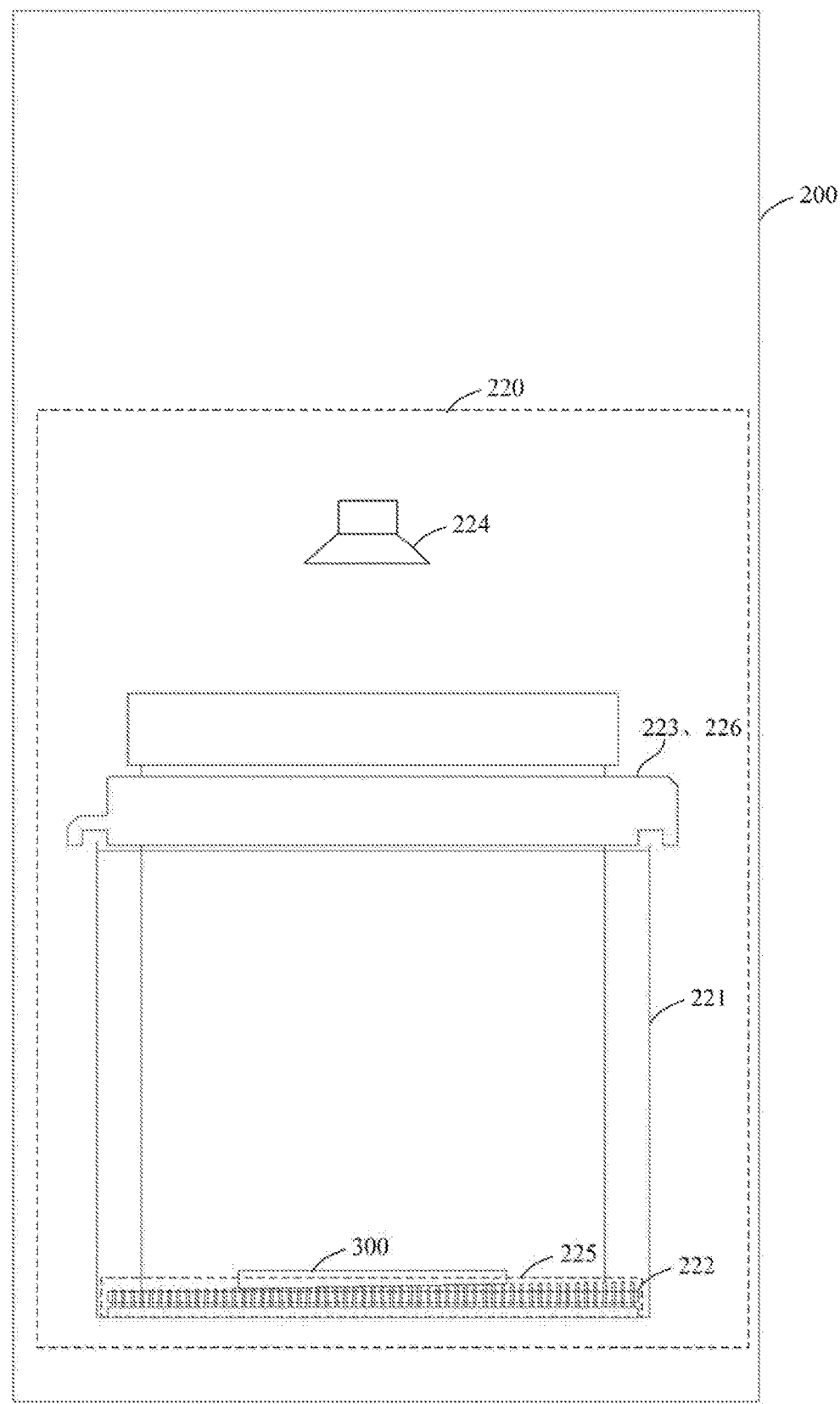

FIG. 7*b* is schematic structural diagram of an automatic printing and pick-up collecting apparatus when the workpiece is jacked up according to an embodiment of the present invention. Referring to FIG. 7*b*, the lifting platform 222 is moved downwardly to the bottom of the material tank 221, and the ejector rods of the jacking apparatus 225 pass through the corresponding through holes in the lifting platform 222 to jack the workpiece 300 securely connected to the lifting platform 222 up, such that the workpiece 300 is separated from the lifting platform 222.

Figure 7C:
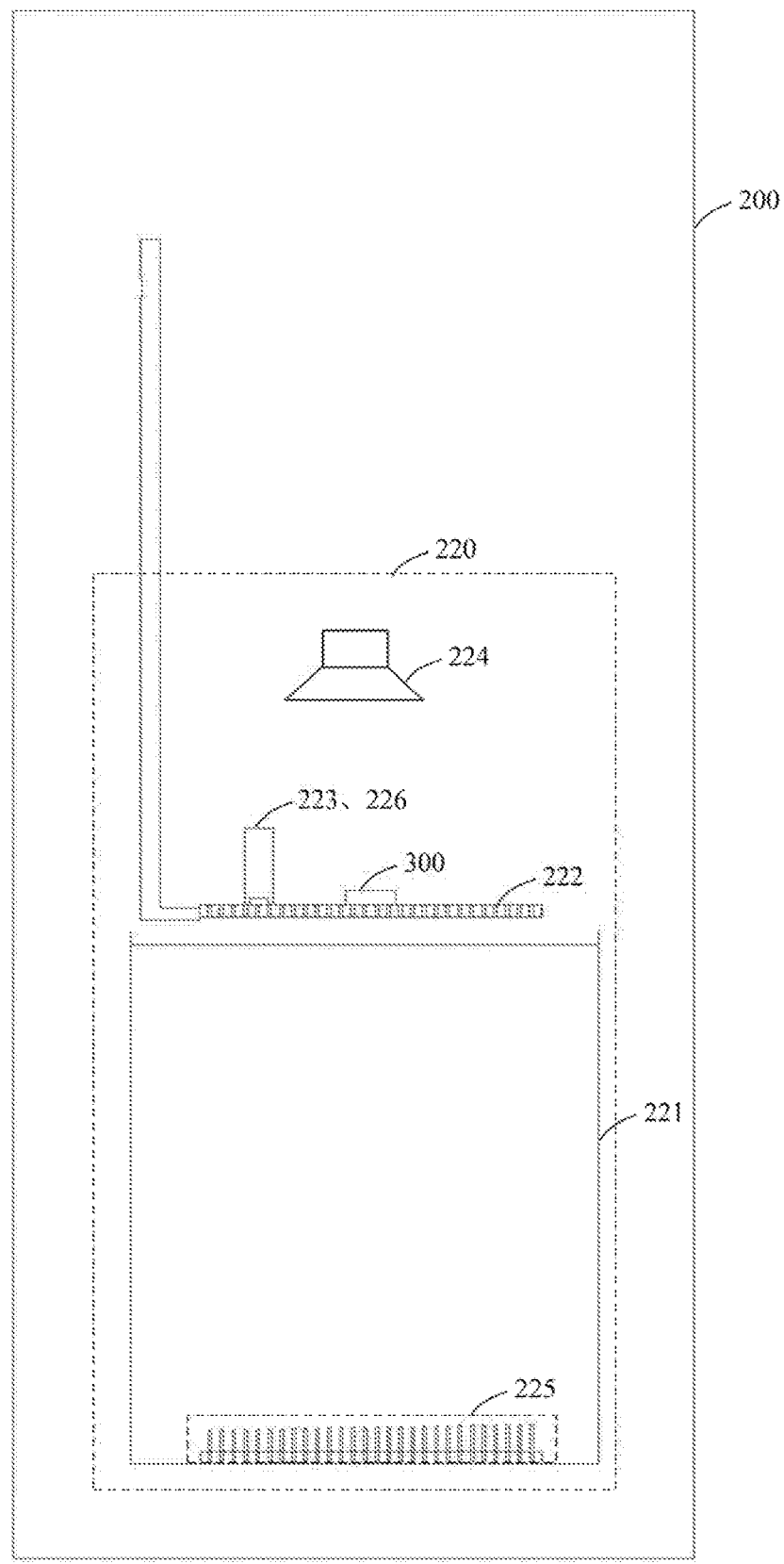

FIG. 7*c* is a schematic structural diagram of an automatic printing and pick-up collecting apparatus after the workpiece is separated from the lifting platform and the lift platform is lifted according to an embodiment of the present invention. Referring to FIG. 7*c*, after the workpiece 300 is separated from the lifting platform 222, the lifting platform 222 carries the workpiece 300 and moves upwardly up to the position where the collecting blade 226 can scrape the workpiece 300. For example, the lifting platform 222 moves upwardly to the upper end face of the lifting platform 222 in a position nearly flush with a lower edge of the collecting blade 226. It will be understood that the lifting platform 222 can be moved upwardly to the middle of the workpiece 300 in a position flush with the lower edge of the collecting blade 226.

Figure 7D:
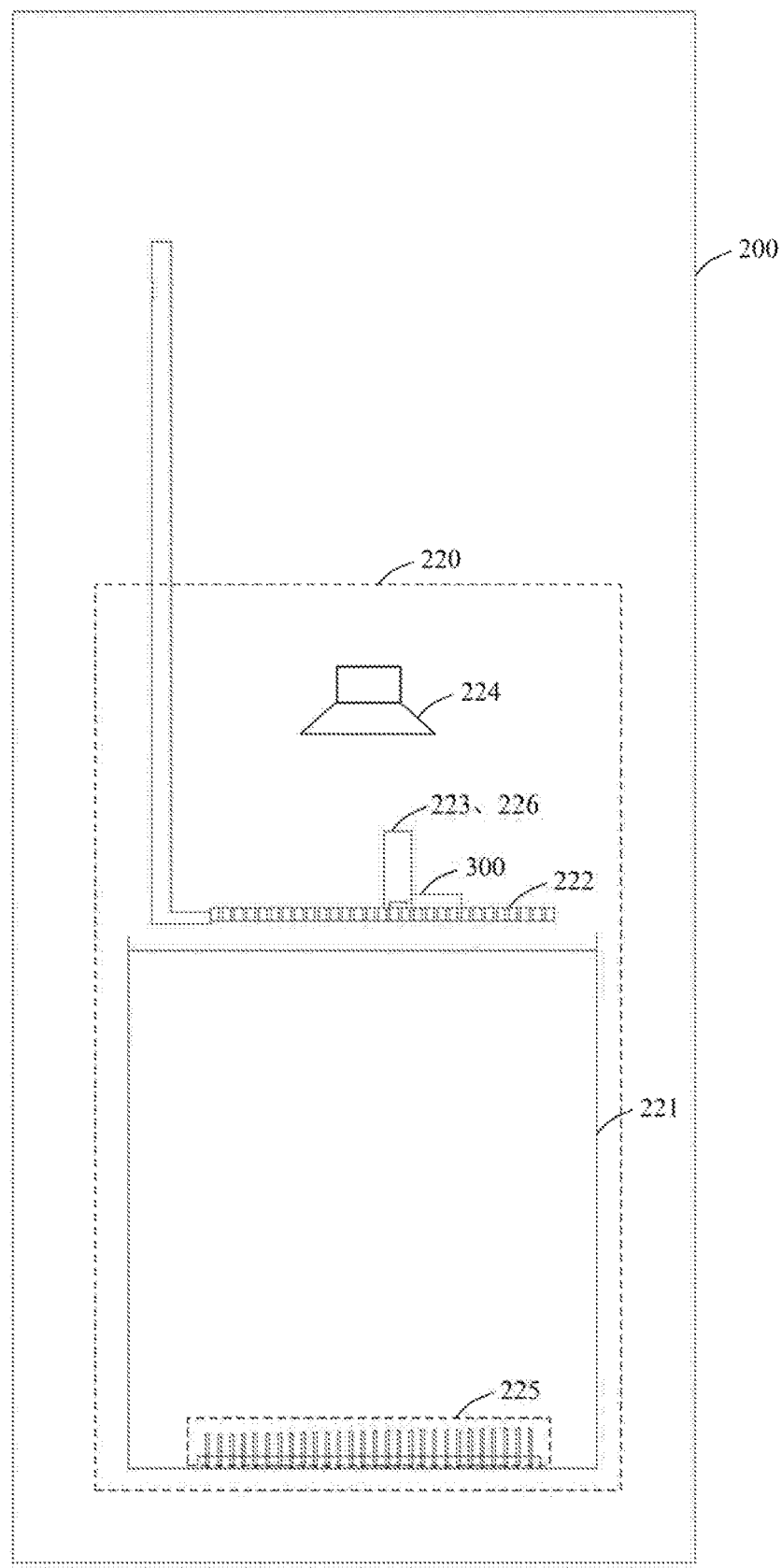

FIG. 7*d* is a schematic structural view of an automatic printing and pick-up collecting apparatus when the blade scraps the workpiece off according to an embodiment of the present invention. Referring to FIG. 7*d*, the lifting platform 222 carries the workpiece 300 and moves upwardly to the position where the collecting blade 226 can scrape the workpiece 300, and the collecting blade 226 moves from one end to the other above the lifting platform 222, to scrape the workpiece 300 away from the lifting platform 222. Optionally, a storage apparatus (not shown) may be provided on an edge of the material tank 221, which is configured to accommodate the collecting blade 226 for scraping the workpiece 300 away from the lifting platform 222.

Figure 8:
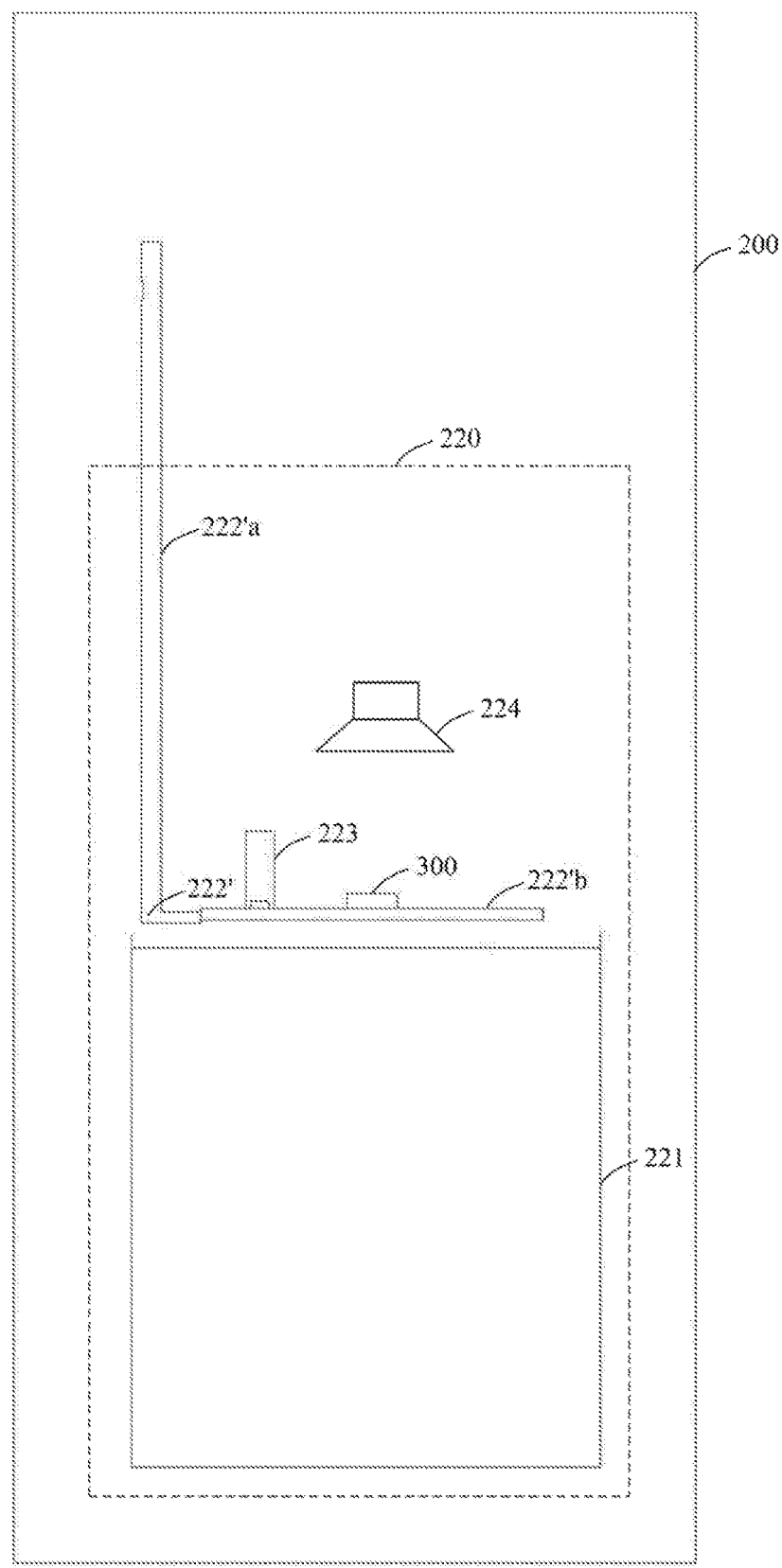
FIG. 8 is a schematic structural diagram of an automatic printing and pick-up collecting apparatus according to another embodiment of the present invention.

FIG. 8 is a schematic structural diagram of an automatic printing and pick-up collecting apparatus according to another embodiment of the present invention. Referring to FIGS. 2 and 8, the automatic printing and pick-up collecting apparatus 220 may comprise a material tank 221 configured to accommodate a photosensitive resin, a lifting platform 222' configured to be connected to a molded workpiece 300, and a coating blade 223 configured to spread the photosensitive resin, and an image exposure system 224 configured to cure the photosensitive resin.

The lifting platform 222' may have a lifting apparatus 222'*a* and a platform 222'*b*, wherein the platform 222'*b* is detachably connected to the lifting apparatus 222'*a*, and the workpiece 300 is molded on the platform 222'*b*. The automatic printing and pick-up collecting apparatus 220 is further provided with an automatic replacement apparatus (not shown) configured to remove the platform 222'*b* having the workpiece 300 from the lifting apparatus 222,*a* and place a new platform 222,*b* on the lifting apparatus 222'*a*. Since the automatic printing and pick-up collecting apparatus 220 shown in this embodiment is to remove the entire platform 222'*b* having the workpiece 300 and replace it with a new one 222'*b*, the removed platform 222'*b* can be subjected to separate pick-up and collection processing by another specialized apparatus, which has the advantage of fast pick-up speed, and is very suitable for assembly line operations.

Figure 9:
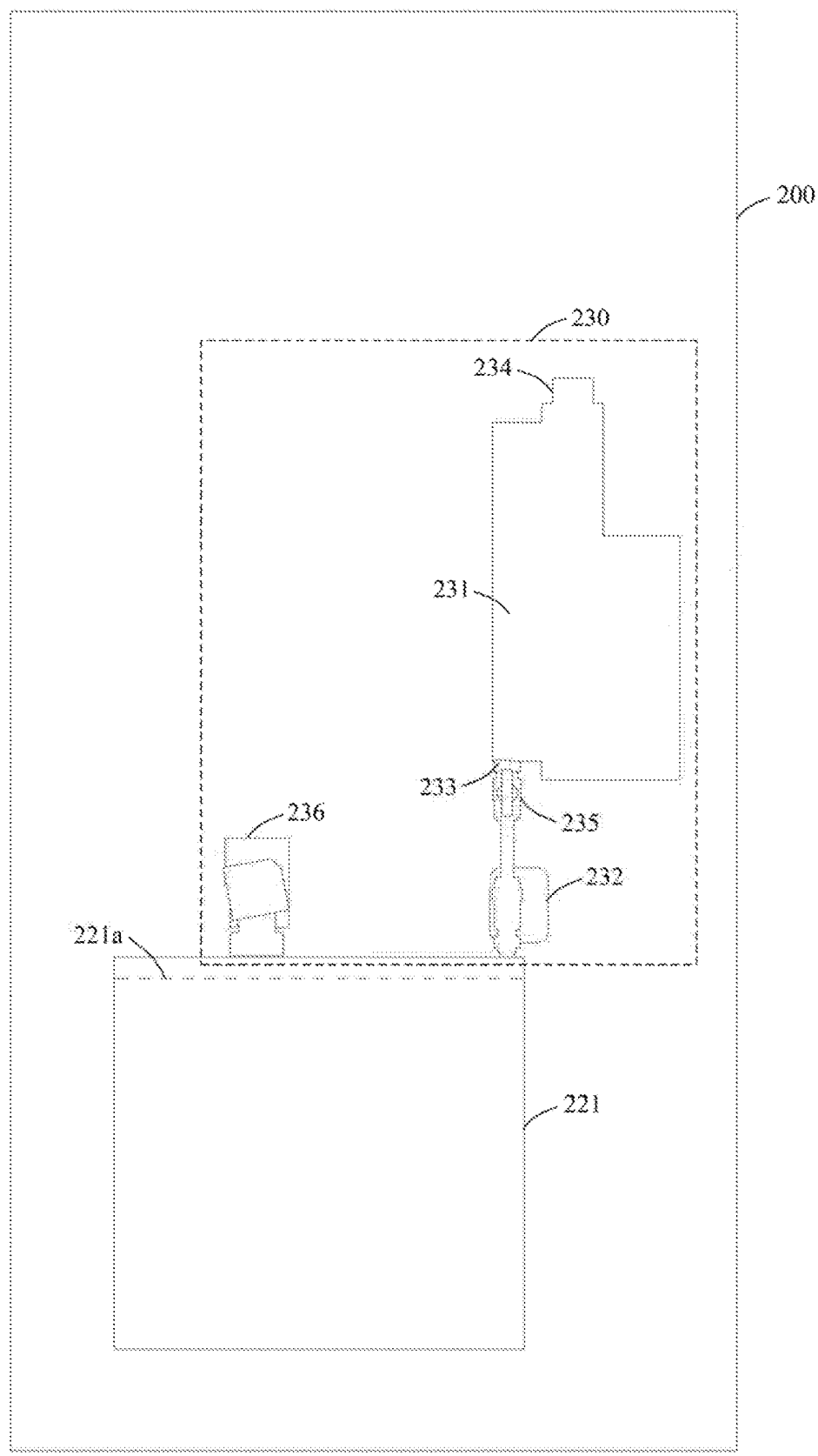
FIG. 9 is a schematic structural diagram of an automatic liquid replenishment apparatus according to an embodiment of the present invention.

FIG. 9 is a schematic structural diagram of an automatic liquid replenishment apparatus according to an embodiment of the present invention. Referring to FIG. 9, the automatic liquid replenishment apparatus 230 is provided with a liquid replenishment case 231 and an electric valve 232. The liquid replenishment case 231 is configured to accommodate the photosensitive resin and is provided above the material tank 221. A bottom face of the liquid replenishment case 231 is provided with a liquid outlet 233 and is connected to the electric valve 232. It will be understood that the liquid outlet 233 may also be provided at the bottom of a side face of the liquid replenishment case 231. When the electric valve 232 is opened, the photosensitive resin within the liquid replenishment case 231 can flow into the material tank 221 via the liquid outlet 233 under the action of gravity to replenish the material tank 221. A top face of the liquid replenishment case 231 may also be provided with a liquid inlet 234 configured to replenish the liquid replenishment case 231 with the photosensitive resin. It will be understood that the automatic liquid replenishment apparatus 230 can operate normally when the liquid level of the photosensitive resin in the liquid replenishment case 231 is higher than the liquid level 221*a* of the photosensitive resin in the material tank 221.

The automatic liquid replenishment apparatus 230 may also have a protective valve 235. The protective valve 235 is provided between the liquid outlet 233 and the electric valve 232. When the electric valve 232, etc. needs to be inspected, the protective valve 235 can be closed to close the passage between the liquid outlet 233 and the electric valve 232. In this way, when the electric valve 232, etc. is inspected, it is not necessary to empty the photosensitive resin within the liquid replenishment case 231, so that the inspection is more convenient. It will be understood that the protective valve 235 is in an open state during normal operation of the automatic liquid replenishment apparatus 230.

The automatic liquid replenishment apparatus 230 may further comprise a liquid level detection apparatus 236. The liquid level detection apparatus 236 is provided above the material tank 221 and configured to detect the liquid level 221a of the photosensitive resin within the material tank 221. The automatic liquid replenishment apparatus 230 controls the opening and closing of the electric valve 232 in accordance with the detection result of the liquid level detection apparatus 236, to control the liquid replenishment timing and the amount of replenished liquid. For example, when the liquid level detection apparatus 236 detects that the liquid level 221a is below a predetermined threshold, the automatic liquid replenishment apparatus 230 opens the electric valve 232 to replenish the material tank 221. When the liquid level detection apparatus 236 detects that the liquid level 221a has reached a desired value, the automatic liquid replenishment apparatus 230 closes the electric valve 232 and stops replenishing the material tank 221.

Although only one liquid level detection apparatus 236 is provided in the embodiment shown in FIG. 9, it will be understood that it is possible to provide multiple liquid level detection apparatuses 236 and dispose same at different positions above the material tank 221. The liquid level detection apparatus 236 may be one or more of an ultrasonic liquid level detector, an optical liquid level detector, a capacitive liquid level detector, etc.

Figure 10:
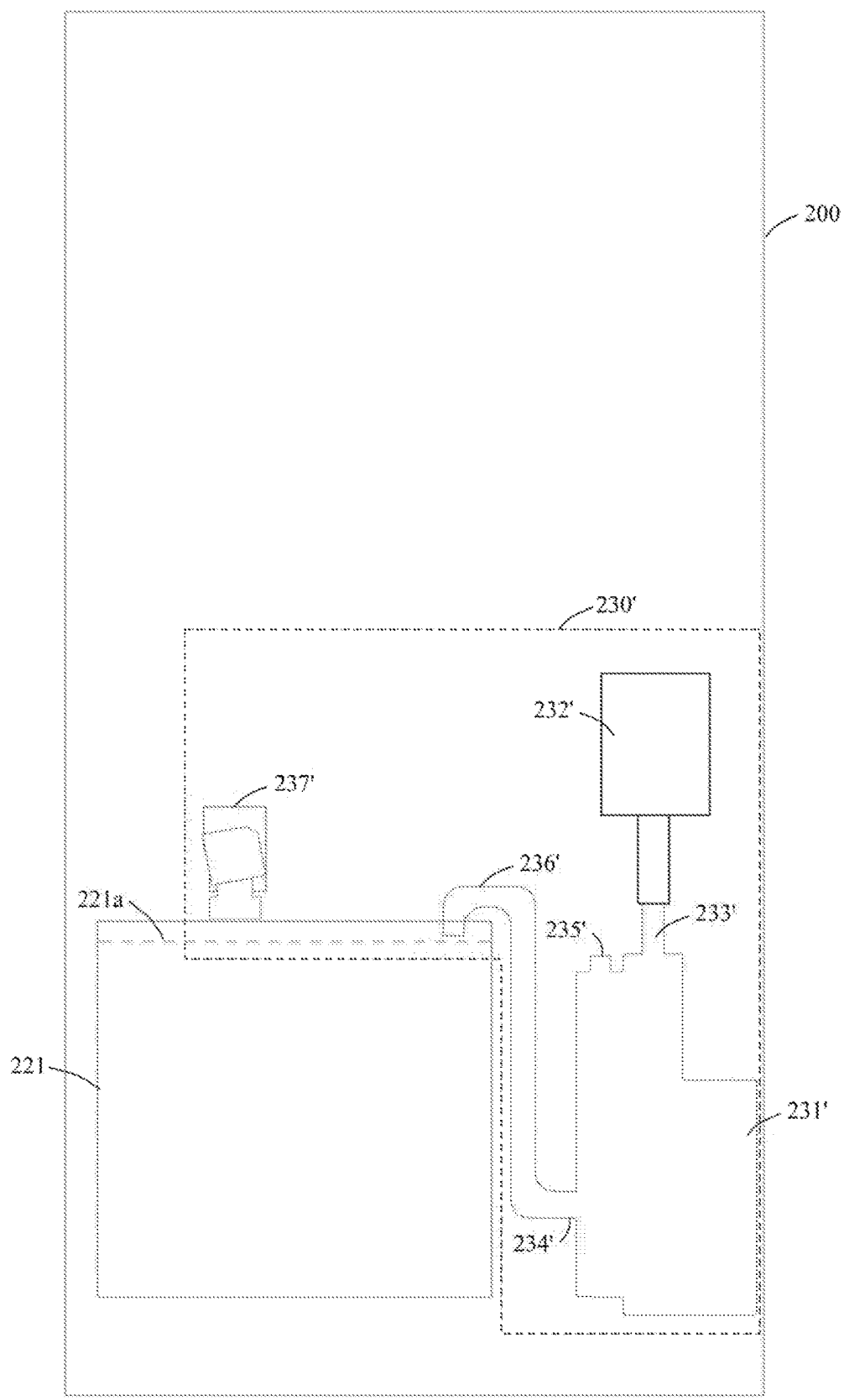
FIG. 10 is a schematic structural diagram of an automatic liquid replenishment apparatus according to another embodiment of the present invention.

FIG. 10 is a schematic structural diagram of an automatic liquid replenishment apparatus according to another embodiment of the present invention. Referring to FIG. 10, the automatic liquid replenishment apparatus 230 is provided with a sealed liquid replenishment case 231' and a gas pumping apparatus 232'.

The liquid replenishment case 231' is configured to accommodate the photosensitive resin. An intake pipe 233' is provided at the top of the liquid replenishment case 231', and a liquid outlet 234' is provided at the bottom of a side face of the liquid replenishment case 231'. It will be understood that the liquid outlet 234' may also be provided at a bottom face of the liquid replenishment case 231'. A top face of the liquid replenishment case 231' may also be provided with a liquid inlet 235' configured to replenish the liquid replenishment case 231' with the photosensitive resin.

The gas pumping apparatus 232' is connected to the intake pipe 233' to inject a gas into the liquid replenishment case 231'. It will be understood that the gas pumping apparatus 232' may be connected to the intake pipe 233' via a hose to prevent the vibration of the gas pumping apparatus 232' from being transferred to the liquid replenishment case 231' during operation. When liquid replenishment is required, the gas pumping apparatus 232' injects the gas into the liquid replenishment case 231', and the gas pressure inside the liquid replenishment case 231' increases as the amount of injected gas increases, thereby causing the photosensitive resin within the liquid replenishment case 231' to flow into the material tank 221 through the liquid outlet 234' to replenish the material tank 221. When the liquid level 221a of the photosensitive resin within the material tank 221 has reached a desired value, the gas pumping apparatus 232' stops injecting the gas into the liquid replenishment case 231' and releases the air pressure inside the liquid replenishment case 231' to stop the liquid replenishment of the material tank 221. The liquid outlet 234' may be connected to a pipeline 236' configured to guide the photosensitive resin flowing out of the liquid outlet 234' into the material tank 221.

In the embodiment shown in FIG. 10, the gas pumping apparatus 232' is provided inside the photocuring-type three-dimensional printing device 200, but it will be understood that the gas pumping apparatus 232' may be provided outside the photocuring-type three-dimensional printing device 200 and is connected to the intake pipe 233' via a pipeline to prevent the vibration of the gas pumping apparatus 232' from being transferred to the photocuring-type three-dimensional printing device 200 during operation.

The automatic liquid replenishment apparatus 230' may further comprise a liquid level detection apparatus 237'. The liquid level detection apparatus 237' is provided above the material tank 221 and configured to detect the liquid level 221a of the photosensitive resin within the material tank 221. The automatic liquid replenishment apparatus 230 controls the opening and closing of the gas pumping apparatus 232' in accordance with the detection result of the liquid level detection apparatus 237, to control the liquid replenishment timing and the amount of replenished liquid. Although only one liquid level detection apparatus 237' is provided in the embodiment shown in FIG. 10, it will be understood that it is possible to provide multiple liquid level detection apparatuses 237' and dispose same at different positions above the material tank 221. The liquid level detection apparatus 237' may be one or more of an ultrasonic liquid level detector, an optical liquid level detector, a capacitive liquid level detector, etc.

Figure 11:
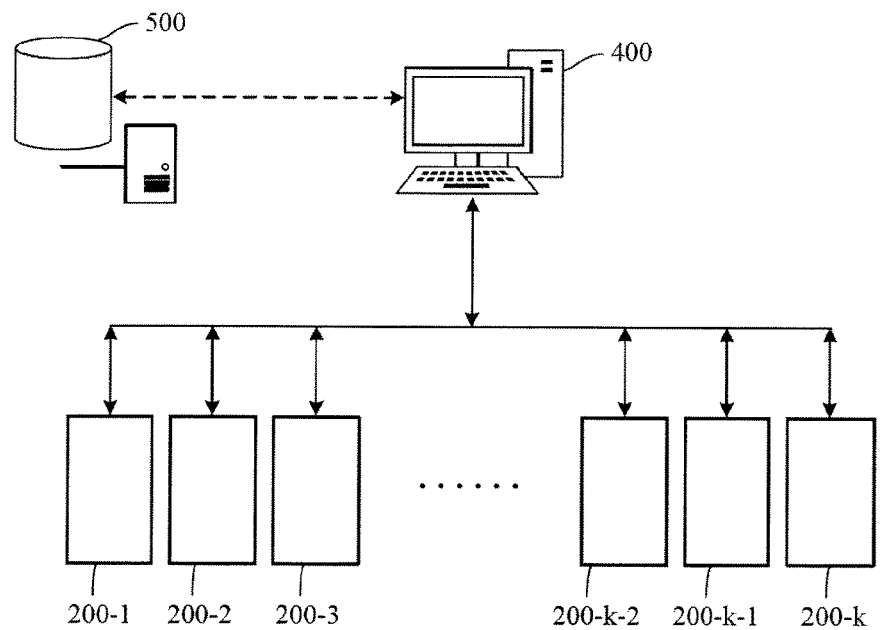
FIG. 11 is a schematic structural diagram of a photocuring-type three-dimensional printing system capable of automatic continuous printing according to an embodiment of the present invention.

FIG. 11 is a schematic structural diagram of a photocuring-type three-dimensional printing system capable of automatic continuous printing according to an embodiment of the present invention. Referring to FIG. 11, the photocuring-type three-dimensional printing system 10 capable of automatic continuous printing comprises a host computer 400 and a plurality of three-dimensional printing devices 200-1 to 200-k connected to the host computer 400. The host computer 400 is configured to control the printing of the three-dimensional models by the three-dimensional printing devices 200-1 to 200-k. Specifically, when the host computer 400 receives a print job, it queries the states of the three-dimensional printing device 200-1 to 200-k, and if there is an idle three-dimensional printing device 200, the host computer 400 sends the three-dimensional model of the current job to the one or more three-dimensional printing devices 200 in an idle state for printing. After receiving the three-dimensional model, the photocuring-type three-dimensional printing device 200 automatically composes, automatically prints, and pick-up collects the three-dimensional model, and liquid replenishment is automatically carried out when needed. Optionally, the three-dimensional printing devices 220-1 to 200-k can automatically report their current states to the host computer 400, and the host computer 400 stores the states reported by the three-dimensional printing devices 200-1 to 200-k. The query of the states of the three-dimensional printing devices 200-1 to 200-k by the host computer 400 may also be a query local to the host computer 400. It will be understood that the query of the states of the three-dimensional printing devices 200-1 to 200-$k$ by the host computer 400 may also be a query directly to the three-dimensional printing devices 200-1 to 200-$k$. The states of the three-dimensional printing devices 200-1 200-$k$ include, but are not limited to, idle, in-print, and fault.

The photocuring-type three-dimensional printing system 10 may further comprise a server 500. The server 500 is configured to receive and process a print job from a remote user, and send the print job from the remote user to the host computer 400 when the host computer 400 is connected to the server 500 via a network to obtain the print job. The network in which the host computer 400 is connected to the server 500 includes, but is not limited to, an ADSL network, an LAN network, a WLAN network, and a WAN network.

Figure 12:
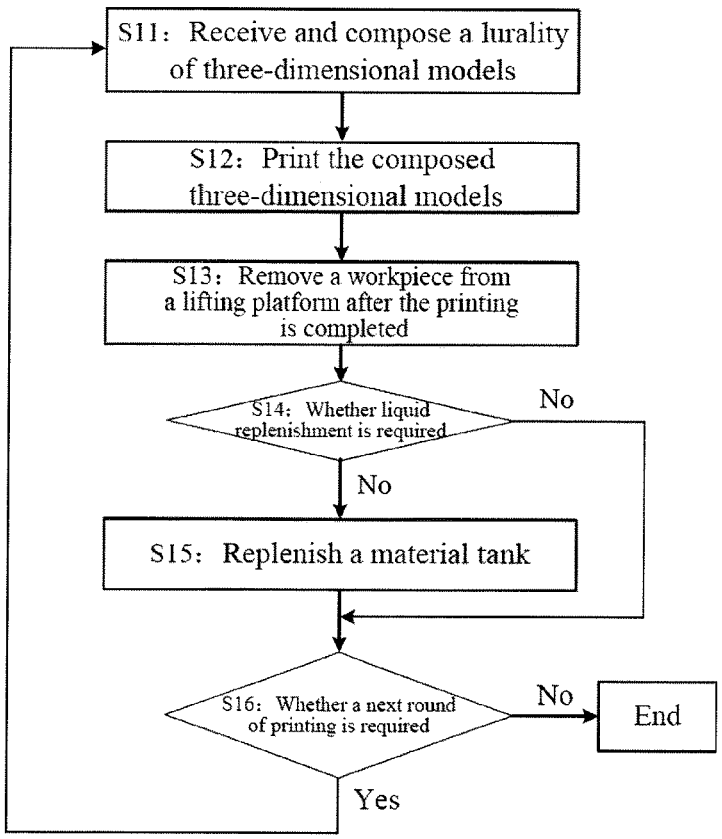
FIG. 12 is a flow chart of an automatic continuous printing method according to an embodiment of the present invention.

FIG. 12 is a flow chart of an automatic continuous printing method according to an embodiment of the present invention. Referring to FIG. 12, the automatic continuous printing method is implemented by the photocuring-type three-dimensional printing device 200, having the following steps:

S11: receiving and composing a plurality of three-dimensional models;

S12: printing the composed three-dimensional models;

S13: removing the workpiece 300 from the lifting platform 222 after the printing is completed;

S14: determining whether liquid replenishment is required, if yes, proceeding to step S15, and if no, proceeding to step S16;

S15: replenishing the material tank 221 with the photosensitive resin, and proceeding to step S16 after the liquid replenishment is completed; and S16: determining whether a next round of printing is required, if yes, returning to step S11, and if no, ending the printing.

Step S11 may be performed by the automatic composition system 210, steps S12, S13 may be performed by the automatic printing and pick-up collecting apparatus 220, and steps S14, S15 may be performed by the automatic liquid replenishment apparatus 230.

Figure 13:
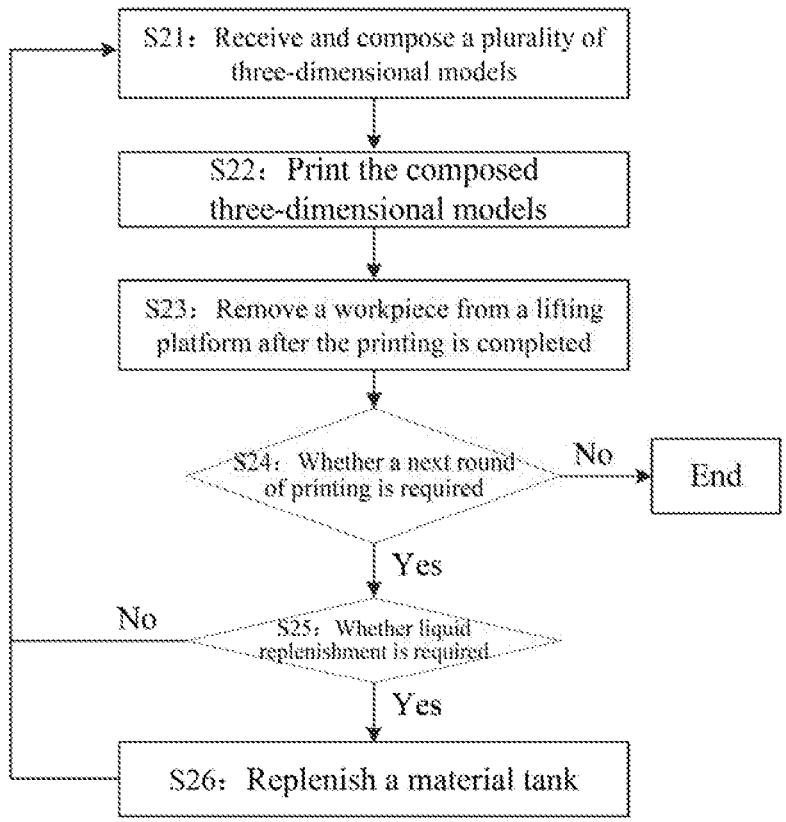
FIG. 13 is a flow chart of an automatic continuous printing method according to another embodiment of the present invention.

FIG. 13 is a flow chart of an automatic continuous printing method according to another embodiment of the present invention. Referring to FIG. 13, the automatic continuous printing method is implemented by the photocuring-type three-dimensional printing device 200, having the following steps:

S21: receiving and composing a plurality of three-dimensional models;

S22: printing the composed three-dimensional models;

S23: removing the workpiece 300 from the lifting platform 222 after the printing is completed;

S24: determining whether a next round of printing is required, if yes, proceeding to step S25, and if no, ending the printing;

S25: determining whether liquid replenishment is required, if yes, proceeding to step S26, and if no, returning to step S21; and S26: replenishing the material tank 221 with the photosensitive resin, and returning to step S21 after the liquid replenishment is completed.

Step S21 may be performed by the automatic composition system 210, steps S22, S23 may be performed by the automatic printing and pick-up collecting apparatus 220, and steps S25, S26 may be performed by the automatic liquid replenishment apparatus 230.

In an embodiment, the plurality of three-dimensional models are composed in steps S11, S21 according to the following composition rule: the plurality of three-dimensional models are arranged in n rows in a direction parallel to the length of a coating blade 223 configured to spread the photosensitive resin, and the heights of the plurality of three-dimensional models in the n rows satisfy the following relationship: assuming that the i-th row is a row where the three-dimensional models having the highest height among the plurality of three-dimensional models are located, the minimum height of multiple three-dimensional models in the i-th row is greater than or equal to the highest height of multiple three-dimensional models in the i+1-th and i−1-th rows, the lowest height of the multiple three-dimensional models in the i+1-th row is greater than or equal to the highest height of multiple three-dimensional models in the i+2-th row, the lowest height of the multiple three-dimensional models in the i−1-th row is greater than or equal to the highest height of multiple three-dimensional models in the i−2-th row, and so on, where i=1, 2, . . . , n.

In an embodiment, the three-dimensional models in at least one of the n rows of the composed three-dimensional models are disposed in such a way that the heights thereof decrease in one direction, as shown by the 4th or 5th row in FIG. 3.

In another embodiment, the three-dimensional models in at least one of the n rows of the composed three-dimensional models are disposed in such a way that the heights thereof decrease from the middle to two sides, as shown by the 3rd row in FIG. 3. Since the photocuring-type three-dimensional printing device 200 has a higher printing quality at the middle position of the lifting platform 222, the arrangement of this embodiment can make maximum use of the area with the higher printing quality.

Figure 14:
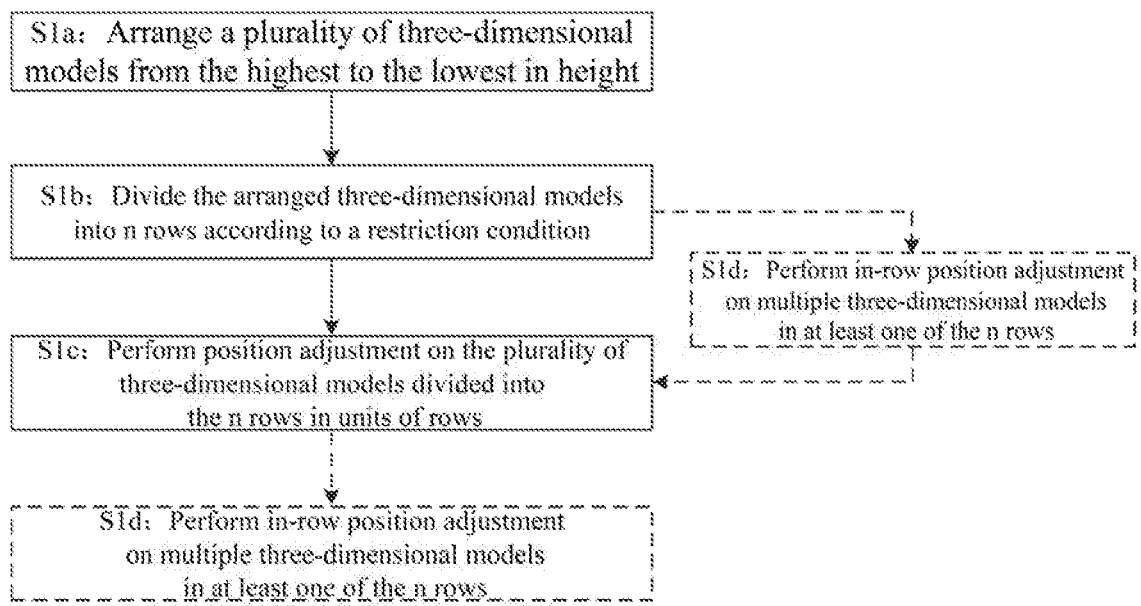
FIG. 14 is a flow chart of the composition of a plurality of three-dimensional models according to an embodiment of the present invention.

FIG. 14 is a flow chart of the composition of a plurality of three-dimensional models according to an embodiment of the present invention. Referring to FIG. 14, the composing of the plurality of three-dimensional models comprises the following steps:

S1$a$: arranging the plurality of three-dimensional models from the highest to the lowest in height;

S1$b$: dividing the arranged three-dimensional models into n rows according to a boundary condition; and S1$c$: performing position adjustment on the plurality of three-dimensional models divided into the n rows in units of rows.

In an embodiment, the method further comprises the following step after step S1$b$, before step S1$c$ or after step S1$c$: S1$d$: performing in-row position adjustment on multiple three-dimensional models in at least one of the n rows.

In an embodiment, the boundary condition for dividing the arranged plurality of three-dimensional models into n rows in step S1$b$ may be that the sum of the maximum widths of the multiple three-dimensional models grouped into one row in the length direction of the coating blade 223 is less than or equal to the minimum of the width of the lifting platform 222 in the length direction of the coating blade 223 and the effective length of the coating blade 223, and the sum of the maximum widths of the plurality of three-dimensional models in the n rows in the scratching direction of the coating blade 223 is less than or equal to the width of the lifting platform 222 in the scratching direction of the coating blade 223. In this way, the areas obtained by the composed plurality of three-dimensional models projected onto the lifting platform 223 in a direction perpendicular to the lifting platform 223 are all within the range of the lifting platform 223, so as to avoid the incomplete printing of the three-dimensional models.

Figure 15:
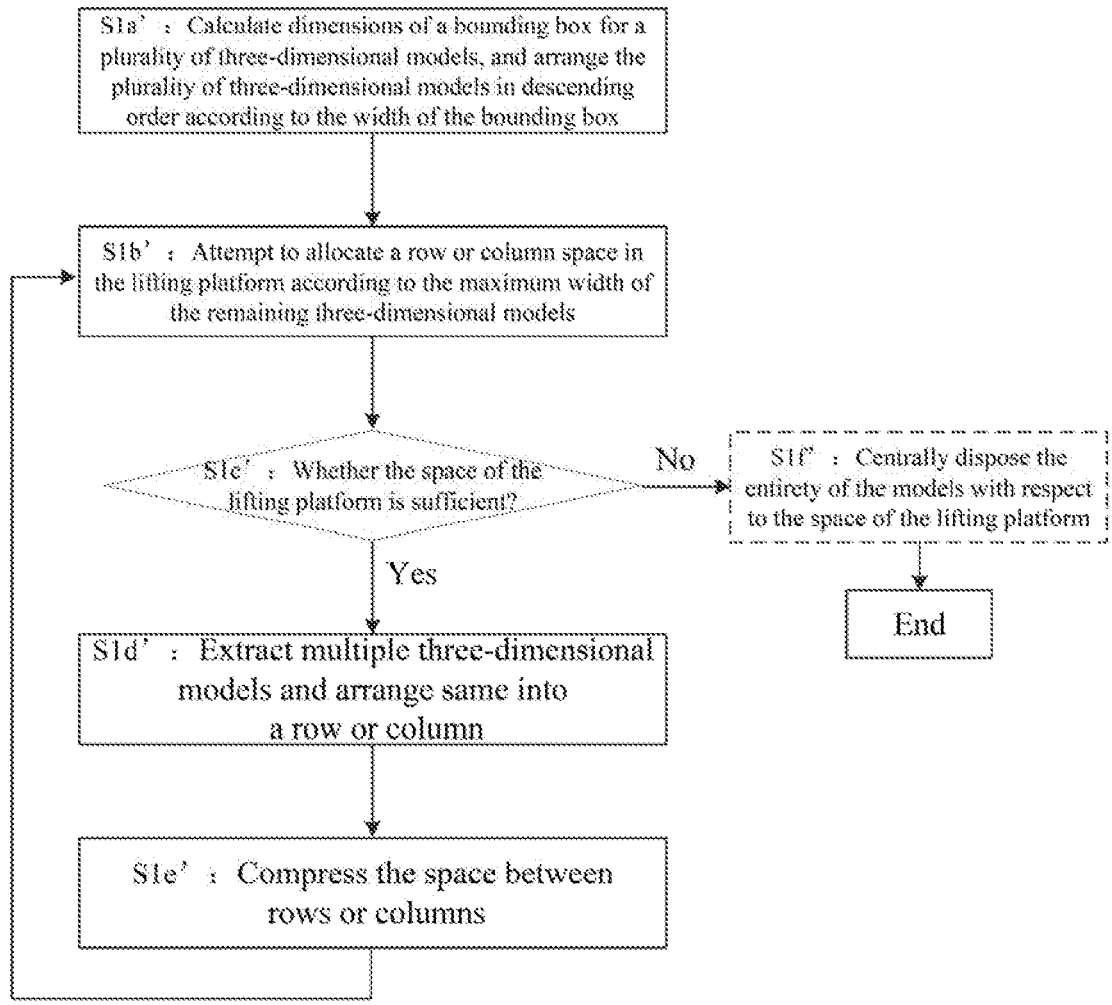
FIG. 15 is a flow chart of the composition of a plurality of three-dimensional models according to another embodiment of the present invention.

FIG. 15 is a flow chart of the composition of a plurality of three-dimensional models according to another embodiment of the present invention. Referring to FIG. 15, the composing of the plurality of three-dimensional models may comprise the following steps:

S1$a'$: calculating dimensions of a bounding box for the plurality of three-dimensional models, and arranging the plurality of three-dimensional models in descending order according to the width of the bounding box;

S1$b'$: attempting to allocate a row or column space in the lifting platform according to the maximum width of the remaining three-dimensional models;

S1$c'$: determining whether the space of the lifting platform is sufficient, if yes, proceeding to step S1$d'$, and if no, ending;

S1$d'$: extracting multiple three-dimensional models and arranging same into a row or column; and S1$e'$: compressing the space between rows or columns, and returning to step S1$b'$.

Optionally, when the determination in step S1$c'$ is no, before ending, step S1$f'$ may be further comprised: centrally disposing the entirety of the models with respect to the space of the lifting platform.

Figure 16:
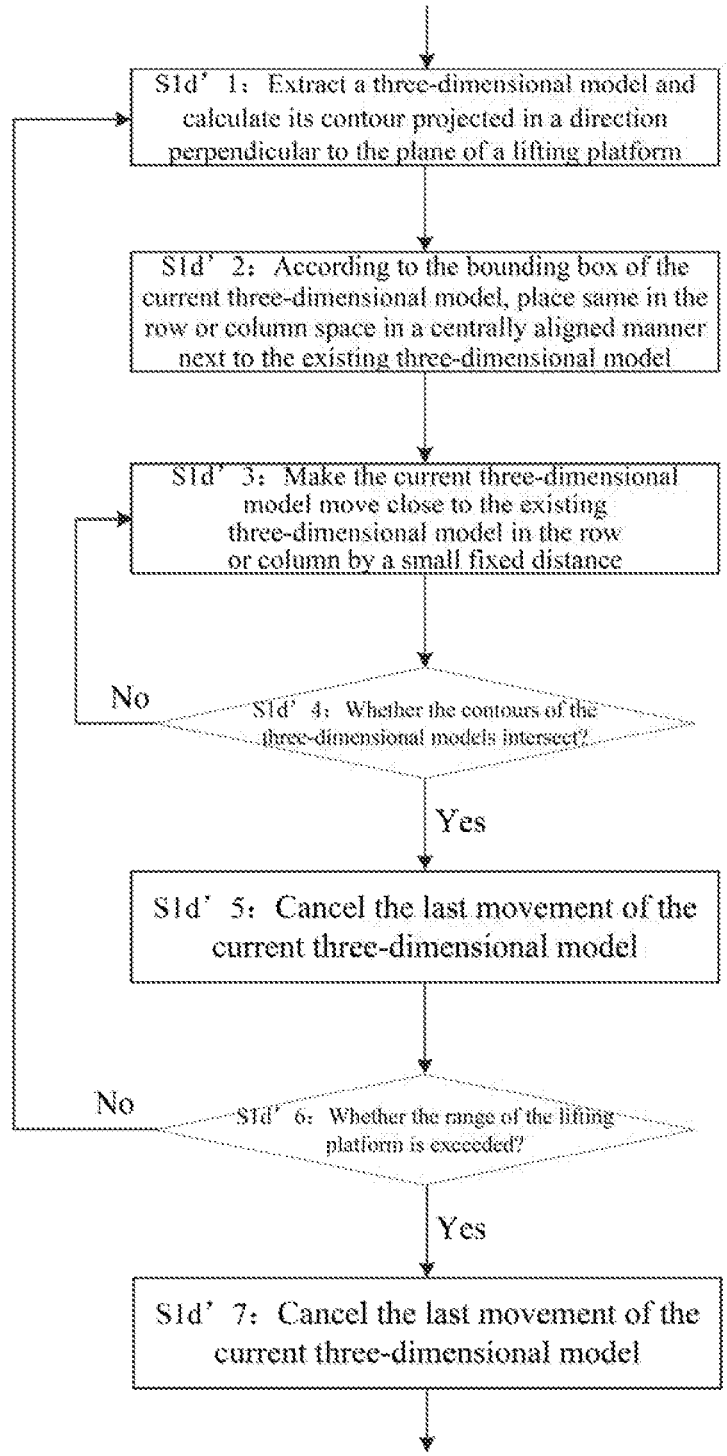
FIG. 16 is a flow chart according to another embodiment of the present invention, wherein multiple three-dimensional models are extracted and arranged into a row or column.

FIG. 16 is a flow chart according to another embodiment of the present invention, wherein multiple three-dimensional models are extracted and arranged into a row or column. Referring to FIG. 16, the extraction of the multiple three-dimensional models and the arrangement of same into a row or column may comprise the following steps:

S1$d'$1: extracting a three-dimensional model and calculating its contour projected in a direction perpendicular to the plane of the lifting platform;

S1$d'$2: according to the bounding box of the current three-dimensional model, placing same in the row or column space in a centrally aligned manner next to the existing three-dimensional model;

S1$d'$3: making the current three-dimensional model move close to the existing three-dimensional model in the row or column by a small fixed distance;

S1$d'$4: determining whether the contours of the three-dimensional models intersect, if yes, proceeding to step S1$d'$5, and if no, returning to step S1$d'$3;

S1$d'$5: canceling the last movement of the current three-dimensional model;

S1$d'$6: determining whether the range of the lifting platform is exceeded, if yes, proceeding to step S1$d'$7, and if no, returning to step S1$d'$1; and S1$d'$7: canceling the last movement of the current three-dimensional model.

Figure 17:
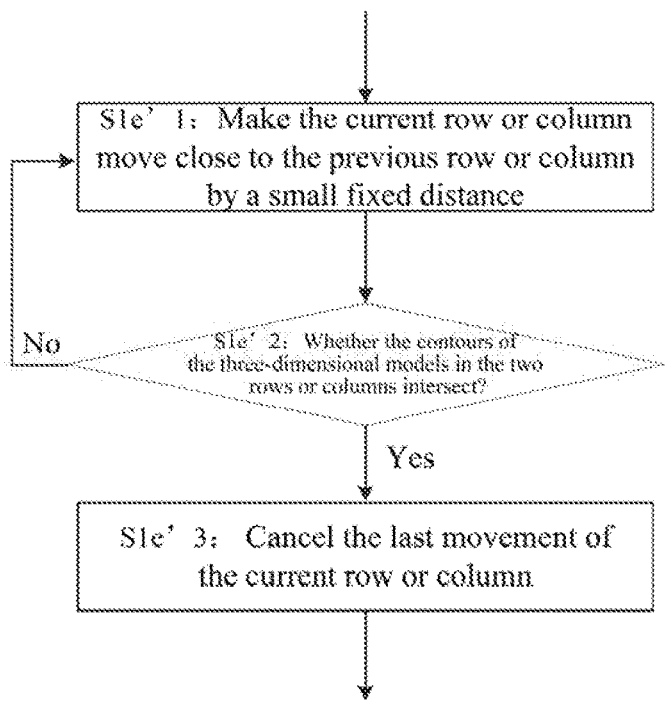
FIG. 17 is a flow chart of the compression of a space between rows or columns according to another embodiment of the present invention.

FIG. 17 is a flow chart of the compression of a space between rows or columns according to another embodiment of the present invention. Referring to FIG. 17, the compression of a space between rows or columns may comprise the following steps:

S1$e'$1: making the current row or column move close to the previous row or column by a small fixed distance, S1$e'$2: determining whether the contours of the three-dimensional models in the two rows or columns intersect, if yes, proceeding to step S1$e'$3, and if no, returning to step S1$e'$1; and S1$e'$3: canceling the last movement of the current row or column.

Figure 18:
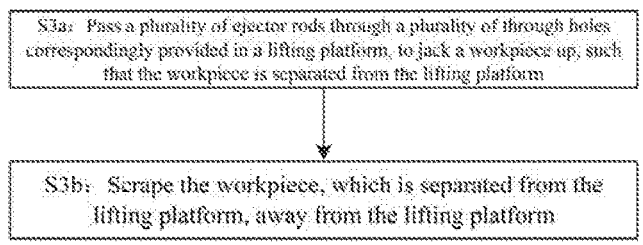
FIG. 18 is a flow chart of the removal of a workpiece from a lifting platform according to an embodiment of the present invention.

FIG. 18 is a flow chart of the removal of a workpiece from a lifting platform according to an embodiment of the present invention. The automatic pick-up method is applicable to the photocuring-type three-dimensional printing device 200 as shown in FIG. 7$a$-7$d$. Referring to FIG. 18, the step of removing the workpiece from the lifting platform comprises:

S3$a$: passing a plurality of ejector rods through a plurality of through holes in the lifting platform 222, to jack the workpiece 300 up, such that the workpiece 300 is separated from the lifting platform 222; and S3$b$: scraping the workpiece 300, which is separated from the lifting platform 222, away from the lifting platform.

In an embodiment, the plurality of ejector rods are vibrated in the process of jacking the workpiece up 300 by the plurality of ejector rods in step S3$a$.

Figure 19:
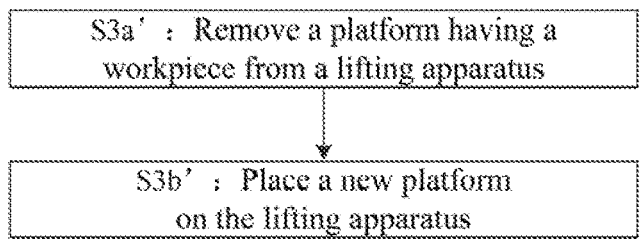
FIG. 19 is a flow chart of the removal of a workpiece from a lifting platform according to another embodiment of the present invention.

FIG. 19 is a flow chart of the removal of a workpiece from a lifting platform according to another embodiment of the present invention. The automatic pick-up method is applicable to the photocuring-type three-dimensional printing device 200 as shown in FIG. 8. Referring to FIG. 19, the step of removing the workpiece from the lifting platform comprises:

S3$a'$: removing the platform 222'$b$ having the workpiece 300 from the lifting apparatus 222'$a$; and S3$b'$: placing a new platform 222'$b$ on the lifting apparatus 222'$a$.

In an embodiment, the step of replenishing the material tank 221 is performed by providing a liquid replenishment case 231 above the material tank 221 and making the photosensitive resin in the liquid replenishment case 231 flow into the material tank 221 under the action of gravity during liquid replenishment.

In an embodiment, the step of replenishing the material tank 221 is performed by providing a sealed liquid replenishment case 231', and injecting a gas into the liquid replenishment case 231' such that the photosensitive resin in the liquid replenishment case 231' flows into the material tank 221 under the action of gas pressure.

Figure 20:
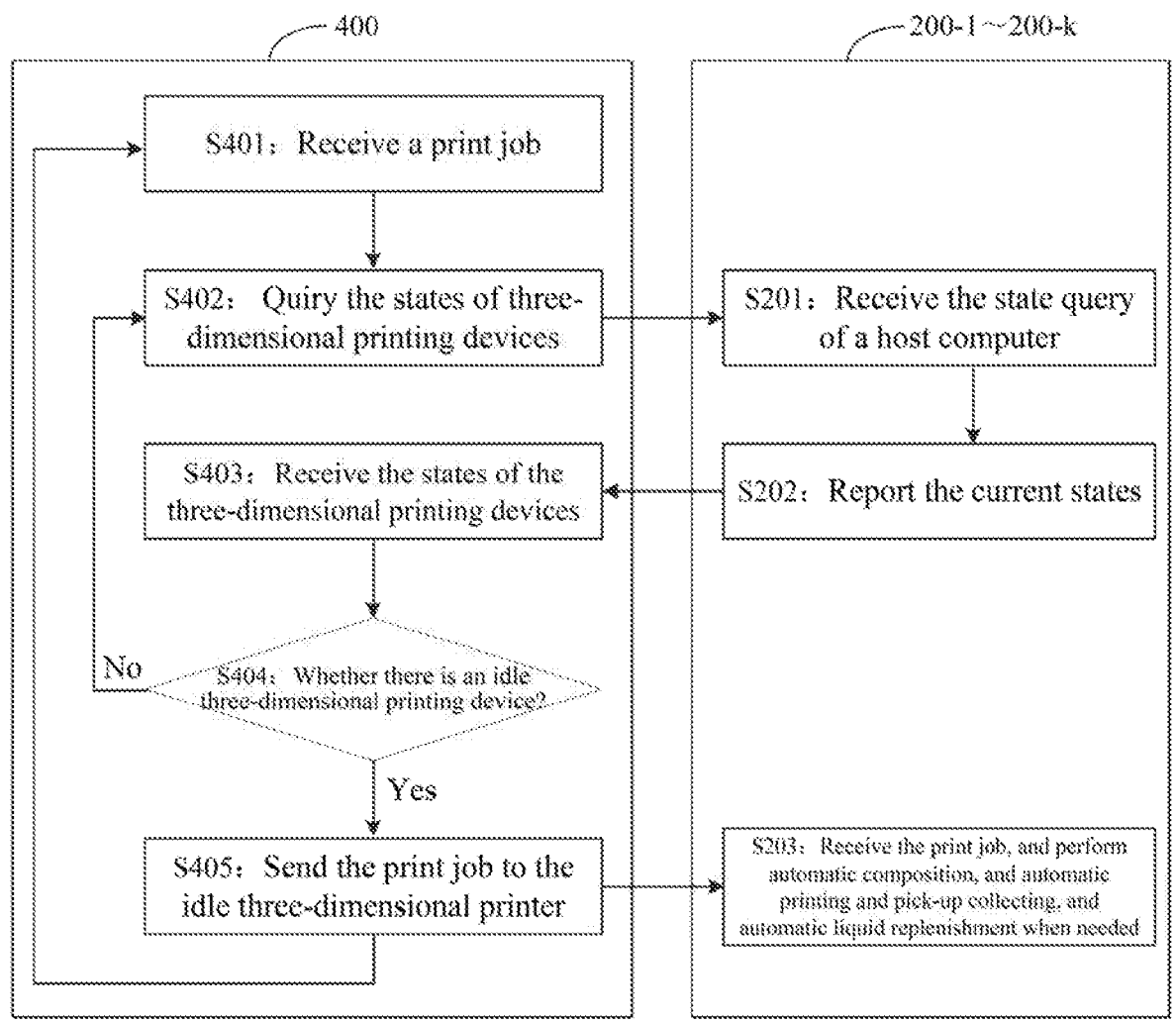
FIG. 20 is a flow chart of an automatic continuous printing method of a three-dimensional printing system according to an embodiment of the present invention.

FIG. 20 is a flow chart of an automatic continuous printing method of a three-dimensional printing system according to an embodiment of the present invention. Referring to FIG. 20, the host computer 400 performs step S401 of receiving a print job, and step S402 of quiring the states of three-dimensional printing devices; the three-dimensional printing devices 200-1 to 200-$k$ receive the state query of the host computer in step S201, and report to the host computer 400 their current states in step S202; the host computer 400 receives the states of the three-dimensional printing devices in step S403, and determines whether there is an idle three-dimensional printing device in step 404, if yes, proceeding to step S405 of sending the print job to the idle three-dimensional printer, and returning to step S401; the three-dimensional printing devices 200-1 to 200-$k$ receive the print job in step S203, and perform automatic composition, and automatic printing and pick-up collecting, and automatic liquid replenishment when needed; and if there is no idle three-dimensional printing device, the host computer 400 returns to step S402. The states of the three-dimensional printing devices 200-1 200-$k$ include, but are not limited to, idle, in-print, and fault.

Optionally, the three-dimensional printing devices 220-1 to 200-$k$ can automatically report their current states to the host computer 400, and the host computer 400 stores the states reported by the three-dimensional printing devices 200-1 to 200-$k$. The query of the states of the three-dimensional printing devices 200-1 to 200-$k$ by the host computer 400 may also be a query local to the host computer 400.

The three-dimensional printing devices 200-1 to 200-$k$ receive the print job in step S203, and perform automatic composition, and automatic printing and pick-up collecting, and automatic liquid replenishment when needed, which may adopt at least one of the three-dimensional automatic continuous printing methods as shown in FIGS. 12 and 13.

The host computer 400 may directly receive the print job from the user by means of a user interface, or may receive the print job from the remote user by communicating with a server 500. The present invention is not limited thereto.

Although the present invention has been described with reference to the present particular embodiments, the ordinary skilled in the art is to recognize that these embodiments are only for illustrating the present invention, and that various equivalent changes or replacements can be made without departing from the spirit of the present invention; hence, changes and variations to the above-mentioned embodiments within the true spirit scope of the present invention will all fall into the scope of the claims of the present application.

The invention claimed is:

1. A photocuring-type three-dimensional printing device capable of automatic continuous printing, comprising:
    an automatic printing and pick-up collecting apparatus comprising a material tank, a lifting platform, a jacking apparatus disposed in the material tank below the lifting platform, a collecting blade provided above the lifting platform, and a controller; wherein the material tank is configured to accommodate a photosensitive resin, wherein the lifting platform comprises distributed through holes and is configured to be connected to a molded workpiece, wherein the jacking apparatus comprises distributed ejector rods, wherein each of the distributed ejector rods is configured to pass through a respective one of the distributed through holes, wherein the controller is configured to:
    receive composed three-dimensional models,
    cause the automatic printing and pick-up collecting apparatus to print the composed three dimensional models to form the molded workpiece,
    cause at least one of the lifting platform and the jacking apparatus to move toward the other so that the distributed ejector rods protrude through the distributed through holes to separate the molded workpiece from the lifting platform and so that the lifting platform is at a position where the collecting blade can scrape the workpiece, and
    after the workpiece is separated from the lifting platform, cause the collecting blade to scrape the workpiece away from the lifting platform; and
    an automatic liquid replenishment apparatus configured to determine whether liquid replenishment is required, and if so, replenish the material tank with the photosensitive resin.

2. The photocuring-type three-dimensional printing device according to claim 1, further comprising an automatic composition system configured to receive and compose a plurality of three-dimensional models and output the composed three-dimensional models, wherein the automatic composition system composes the plurality of three-dimensional models according to a composition rule as follows:
    the plurality of three-dimensional models are arranged in n rows in a direction parallel to a length of a coating blade configured to spread the photosensitive resin, and heights of the plurality of three-dimensional models in the n rows satisfy the following relationship:
    assuming that an i-th row is a row where the three-dimensional models having the highest height among the plurality of three-dimensional models are located, the minimum height of multiple three-dimensional models in the i-th row is greater than or equal to the highest height of multiple three-dimensional models in the i+1-th and i−1-th rows, the lowest height of the multiple three-dimensional models in the i+1-th row is greater than or equal to the highest height of multiple three-dimensional models in the i+2-th row, the lowest height of the multiple three-dimensional models in the i−1-th row is greater than or equal to the highest height of multiple three-dimensional models in an i−2-th row, and so on, where n is a natural number, and i=1, 2, . . . , n.

3. The photocuring-type three-dimensional printing device according to claim 2, wherein multiple three-dimensional models in at least one of the n rows are disposed in such a way that the heights thereof decrease in one direction.

4. The photocuring-type three-dimensional printing device according to claim 2, wherein multiple three-dimensional models in at least one of the n rows are disposed in such a way that the heights thereof decrease from the middle to two sides.

5. The photocuring-type three-dimensional printing device according to claim 2, wherein the automatic composition system comprises:
    an ordering module configured to arrange the plurality of three-dimensional models from the highest to the lowest in height;
    a dividing module configured to divide the arranged three-dimensional models into n rows according to a boundary condition; and
    an inter-row adjustment module configured to perform position adjustment on the plurality of three-dimensional models divided into the n rows in units of rows.

6. The photocuring-type three-dimensional printing device according to claim 5, wherein the automatic composition system comprises:
    an in-row adjustment module configured to perform in-row position adjustment on multiple three-dimensional models in at least one of the n rows.

7. The photocuring-type three-dimensional printing device according to claim 2, wherein the coating blade only scratches an area being printed.

8. The photocuring-type three-dimensional printing device according to claim 1, further comprising an automatic composition system that comprises:
    an ordering module configured to calculate dimensions of a bounding box for the plurality of three-dimensional models, and arrange the plurality of three-dimensional models in descending order according to a width of the bounding box;
    a space allocation module configured to attempt to allocate a row or column space in the lifting platform according to the maximum width of the remaining three-dimensional models, and determine whether the space of the lifting platform is sufficient;
    an arranging module configured to extract multiple three-dimensional models and arrange same into a row or column if the lifting platform has a sufficient space; and
    a space compression module configured to reduce the spacing between rows or columns after the multiple three-dimensional models are arranged into a row or column.

9. The photocuring-type three-dimensional printing device according to claim 8, wherein the automatic composition system further comprises a model entirety centering module configured to centrally dispose the entirety of the models with respect to the space of the lifting platform when the lifting platform does not have a sufficient space.

10. The photocuring-type three-dimensional printing device according to claim 1, wherein:
the automatic printing and pick-up collecting apparatus is further provided with a storage apparatus configured to accommodate the collected workpiece.

11. The photocuring-type three-dimensional printing device according to claim 1, wherein:
the jacking apparatus is further provided with a vibration apparatus; and
the vibration apparatus vibrates the distributed ejector rods.

12. The photocuring-type three-dimensional printing device according to claim 1, wherein the lifting platform is provided with a lifting apparatus and a platform, the platform is detachably connected to the lifting apparatus, and the workpiece is molded on the platform; and the automatic printing and pick-up collecting apparatus is further provided with an automatic replacement apparatus configured to remove the platform having the workpiece from the lifting apparatus and provide a new platform on the lifting apparatus.

13. The photocuring-type three-dimensional printing device according to claim 1, wherein the automatic liquid replenishment apparatus is provided with a liquid replenishment case and an electric valve;
the liquid replenishment case is provided above the material tank and configured to accommodate the photosensitive resin;
the electric valve is connected to a bottom face and/or the bottom of a side face of the liquid replenishment case; and
when the material tank needs to be replenished, the electric valve is opened, so that the photosensitive resin in the liquid replenishment case flows into the material tank via gravity.

14. The photocuring-type three-dimensional printing device according to claim 1, wherein the automatic liquid replenishment apparatus is provided with a sealed liquid replenishment case and a gas pumping apparatus;
the liquid replenishment case is configured to accommodate the photosensitive resin;
the gas pumping apparatus is configured to inject a gas into the liquid replenishment case; and
when the material tank needs to be replenished, the gas pumping apparatus injects the gas into the liquid replenishment case, such that the photosensitive resin in the liquid replenishment case flows into the material tank via gas pressure.

15. The photocuring-type three-dimensional printing device according to claim 14, wherein the automatic liquid replenishment apparatus is further provided with a liquid level detection apparatus configured to detect the liquid level of the photosensitive resin in the material tank.

16. The photocuring-type three-dimensional printing device according to claim 1, wherein the automatic printing and pick-up collecting apparatus is configured to receive and print the composed three-dimensional models simultaneously.

17. The photocuring-type three-dimensional printing device according to claim 1, wherein the automatic printing and pick-up collecting apparatus comprises a lifting apparatus connected to the lifting platform and operable to move the lifting platform down onto the jacking apparatus.

18. A photocuring-type three-dimensional printing system capable of automatic continuous printing, the system comprising:
photocuring-type three-dimensional printing devices, wherein each of the photocuring-type three-dimensional printing devices is capable of automatic continuous printing and comprises:
an automatic printing and pick-up collecting apparatus comprising a material tank, a lifting platform, a jacking apparatus disposed in the material tank below the lifting platform, a collecting blade provided above the lifting platform, and a controller; wherein the material tank is configured to accommodate a photosensitive resin, wherein the lifting platform comprises distributed through holes and is configured to be connected to a molded workpiece, wherein the jacking apparatus comprises distributed ejector rods, wherein each of the distributed ejector rods is configured to pass through a respective one of the distributed through holes, and the controller is configured to:
receive composed three-dimensional models,
cause the automatic printing and pick-up collecting apparatus to print the composed three dimensional models to form the molded workpiece,
cause at least one of the lifting platform and the jacking apparatus to move toward the other so that the distributed ejector rods protrude through the distributed through holes to separate the molded workpiece from the lifting platform and so that the lifting platform is at a position where the collecting blade can scrape the workpiece, and
after the workpiece is separated from the lifting platform, cause the collecting blade to scrape the workpiece away from the lifting platform; and
an automatic liquid replenishment apparatus configured to determine whether liquid replenishment is required, and if so, replenish the material tank with the photosensitive resin; and
a host computer that queries states of the photocuring-type three-dimensional printing devices when receiving a print job, and if there is an idle photocuring-type three-dimensional printing device, the host computer sends the three-dimensional model of a current job to the one or more photocuring-type three-dimensional printing devices in an idle state for printing.

19. The photocuring-type three-dimensional printing system according to claim 18, further comprising a server, wherein the server is configured to receive and process a print job from a remote user, and send the print job from the remote user to the host computer when the host computer is connected to the server via a network to obtain the print job.

20. The photocuring-type three-dimensional printing system according to claim 18, further comprising an automatic composition system configured to receive and compose a plurality of three-dimensional models and output the composed three-dimensional models.

* * * * *